(12) United States Patent
Smith et al.

(10) Patent No.: US 12,350,905 B2
(45) Date of Patent: Jul. 8, 2025

(54) HEAT-TREATABLE COATING HAVING REDUCED HAZE

(71) Applicant: Vitro Flat Glass LLC, Cheswick, PA (US)

(72) Inventors: Jessica Smith, Cheswick, PA (US); Neil Curliss, Salem, OR (US); Maryanne Griffin, Apollo, PA (US); Martin Bracamonte, Jupiter, FL (US)

(73) Assignee: Vitro Flat Glass LLC, Cheswick, PA (US)

( * ) Notice: Subject to any disclaimer, the term of this patent is extended or adjusted under 35 U.S.C. 154(b) by 0 days.

(21) Appl. No.: 17/954,441

(22) Filed: Sep. 28, 2022

(65) Prior Publication Data

US 2023/0112850 A1    Apr. 13, 2023

Related U.S. Application Data

(60) Provisional application No. 63/254,237, filed on Oct. 11, 2021.

(51) Int. Cl.
 *B32B 17/06* (2006.01)

(52) U.S. Cl.
 CPC .......... *B32B 17/06* (2013.01); *B32B 2250/02* (2013.01); *B32B 2255/205* (2013.01);
 (Continued)

(58) Field of Classification Search
 CPC .............. C23C 14/024; C23C 14/0652; C23C 14/0676; C23C 14/081; C23C 14/086; C23C 14/185; C23C 14/35; C23C 14/0042; G01B 5/208; G01B 5/282; Y10T 428/265; B32B 17/06; B32B 2260/02;
 (Continued)

(56) References Cited

U.S. PATENT DOCUMENTS

| 4,193,236 A | 3/1980 | Mazzoni et al. |
| 4,379,040 A | 4/1983 | Gillery |

(Continued)

FOREIGN PATENT DOCUMENTS

| EP | 1538131 A1 | 6/2005 |
| EP | 0847965 B2 | 5/2014 |

(Continued)

OTHER PUBLICATIONS

Alamri et al., "The effect of the transparent conductive oxide on the performance of thin film CdS/CdTe solar cells," J. Phys. D: Appl. Phys. 2000, pp. L1-L4, vol. 33.

(Continued)

*Primary Examiner* — Kevin C T Li
(74) *Attorney, Agent, or Firm* — The Webb Law Firm

(57) ABSTRACT

A coated article includes a substrate with a first surface and a second surface and a functional coating applied over the surface. The functional coating includes a base layer over at least a portion of the substrate; a metallic layer over at least a portion of the base layer; and a top layer over at least a portion of the metallic layer. The base layer includes a first film of tin oxide over at least a portion of the substrate and a second film covering the entire portion of the first film. Methods of making a coated article, reducing scattering center formation, and reducing red haze formation are also provided.

33 Claims, 10 Drawing Sheets

(52) U.S. Cl.
CPC ..... *B32B 2255/28* (2013.01); *B32B 2307/714* (2013.01); *B32B 2311/08* (2013.01); *B32B 2311/16* (2013.01); *B32B 2311/20* (2013.01); *B32B 2315/08* (2013.01); *B32B 2571/00* (2013.01)

(58) Field of Classification Search
CPC .......... B32B 2255/205; B32B 2255/28; B32B 2307/714; B32B 2311/08; B32B 2311/16; B32B 2311/20; B32B 2315/08; B32B 257/10; B32B 2250/02
See application file for complete search history.

(56) References Cited

U.S. PATENT DOCUMENTS

| | | | |
|---|---|---|---|
| 4,464,874 A | 8/1984 | Shea, Jr. et al. | |
| 4,466,562 A | 8/1984 | DeTorre | |
| 4,671,155 A | 6/1987 | Goldinger | |
| 4,746,347 A | 5/1988 | Sensi | |
| 4,792,536 A | 12/1988 | Pecoraro et al. | |
| 4,861,669 A | 8/1989 | Gillery | |
| 4,898,789 A | 2/1990 | Finley | |
| 4,898,790 A | 2/1990 | Finley | |
| 4,900,633 A | 2/1990 | Gillery | |
| 4,920,006 A | 4/1990 | Gillery | |
| 4,938,857 A | 7/1990 | Gillery | |
| 5,030,593 A | 7/1991 | Heithoff | |
| 5,030,594 A | 7/1991 | Heithoff | |
| 5,088,258 A | 2/1992 | Schield et al. | |
| 5,106,663 A | 4/1992 | Box | |
| 5,240,886 A | 8/1993 | Gulotta et al. | |
| 5,328,768 A | 7/1994 | Goodwin | |
| 5,385,872 A | 1/1995 | Gulotta et al. | |
| 5,393,593 A | 2/1995 | Gulotta et al. | |
| 5,492,750 A | 2/1996 | Shumaker, Jr. et al. | |
| 6,045,896 A * | 4/2000 | Boire | C03C 17/3639 428/428 |
| 6,495,251 B1 | 12/2002 | Arbab et al. | |
| 6,899,953 B1 | 5/2005 | O'Shaughnessy et al. | |
| 7,217,460 B2 | 5/2007 | Nunez-Regueiro et al. | |
| 7,364,808 B2 | 4/2008 | Sato et al. | |
| 7,632,571 B2 | 12/2009 | Hartig et al. | |
| 9,012,044 B2 | 4/2015 | Bright | |
| 10,167,225 B2 | 1/2019 | Mercadier | |
| 10,669,192 B2 | 6/2020 | Butz et al. | |
| 2007/0237980 A1* | 10/2007 | Hartig | C03C 17/3686 427/160 |
| 2009/0274901 A1 | 11/2009 | Roquiny | |
| 2011/0236715 A1 | 9/2011 | Polcyn et al. | |
| 2013/0059137 A1 | 3/2013 | Hevesi et al. | |
| 2014/0272453 A1 | 9/2014 | Polcyn et al. | |
| 2016/0223729 A1* | 8/2016 | Medwick | C03C 17/3681 |
| 2017/0341977 A1 | 11/2017 | Polcyn et al. | |
| 2019/0043640 A1 | 2/2019 | Ganjoo et al. | |
| 2019/0242178 A1 | 8/2019 | Fisher et al. | |
| 2020/0181975 A1* | 6/2020 | Padiyath | B32B 7/12 |
| 2022/0119934 A1 | 4/2022 | Narayanan et al. | |

FOREIGN PATENT DOCUMENTS

| | | |
|---|---|---|
| WO | 2008111455 A1 | 9/2008 |
| WO | 2011147875 A1 | 12/2011 |
| WO | 2022087100 A1 | 4/2022 |

OTHER PUBLICATIONS

Kim, J-Y,. "Highly Transparent Tin Oxide Films Prepared by DC Magnetron Sputtering and Its Liquid Crystal Display Application" Jpn. J. Appl. Phys. 2002, pp. 237-240, vol. 41.

* cited by examiner

HEAT-TREATABLE COATING HAVING REDUCED HAZE

CROSS REFERENCE TO RELATED APPLICATION

This application claims priority to U.S. Provisional Application No. 63/254,237 filed on Oct. 11, 2021, the disclosure of which is incorporated by reference in its entirety.

BACKGROUND OF THE INVENTION

Field of the Invention

This invention relates to a base layer and, more particularly, to a base layer having a first film of tin oxide to prevent diffusion of alkali metal ions, alkaline earth metal ions, and metal ions, such as sodium ions and zinc ions, from a glass substrate into a medium (e.g., a coating such as, a solar control coating), or from a medium (e.g., a coating such as, a solar control coating) into a glass substrate.

Technical Considerations

Solar control coatings are known in the fields of architectural and vehicle transparencies. These solar control coatings block or filter selected ranges of electromagnetic radiation, such as, in the range of solar infrared or solar ultraviolet radiation, to reduce the amount of solar energy entering the vehicle or building. This reduction of solar energy transmittance helps reduce the load on the cooling units of the vehicle or building.

These solar control coatings typically include one or more continuous metal layers to provide solar energy reflection, particularly, in the solar infrared region. Metal layers deposited below a critical thickness (referred to herein as "subcritical layers") form discontinuous regions, islands or interconnected islands with uncovered regions between the islands rather than a continuous layer. These discontinuous layers absorb electromagnetic radiation through an effect known as surface Plasmon resonance. These subcritical layers typically have higher absorbance in the visible region than a continuous layer of the same material and also have lower solar energy reflectance.

Upon heating coated articles with solar control coatings, an undesirable haze can occur due to the changes in the optical properties and morphology of the layers of the solar control coating. It would be desirable to produce a solar control coating in which the absorption of the coating and/or the color of the coated article could be maintained before heating and after heating.

SUMMARY OF THE INVENTION

The invention relates to a coated article comprising a substrate. The substrate comprises a first surface and second surface opposite the first surface. A functional coating is applied over at least a portion of the first surface. The functional coating comprises: a base layer over at least a portion of the first surface; a metallic layer over at least a portion of the base layer; and a top layer over at least a portion of the metallic layer. The base layer comprises a first film comprising tin oxide in direct contact with the portion of the first surface and a second film covering the entire portion of the first film.

The invention also relates to a method of reducing scattering center formation in a metallic layer of a coated article. A substrate comprising a first surface and second surface opposite the first surface is provided. A base layer is formed over at least a portion of the first surface. A metallic layer is formed over at least a portion of the base layer. A top layer over at least a portion of the metallic layer, thereby, forming the coated article. The base layer comprises a first film comprising tin oxide in direct contact with the portion of the first surface and a second film covering the entire portion of the first film. The coated article is heated to a temperature of greater than or equal to 1,185° F. The coated article has reduced scattering center formation in the metallic layer after heating to a temperature of greater than or equal to 1,185° F.

The invention also relates to a method of reducing red haze of a coated article. A substrate comprising a first surface and second surface opposite the first surface is provided. A base layer is formed over at least a portion of the first surface. A metallic layer is formed over at least a portion of the base layer. A top layer is formed over at least a portion of the metallic layer, thereby, forming the coated article. The base layer comprises a first film comprising tin oxide over at least a portion of the portion of the first surface and a second film covering the entire portion of the first film. The coated article is heated to a temperature that is greater than or equal to 1,185° F. The coated article has reduced red haze after heating to a temperature of greater than or equal to 1,185° F.

The invention also relates to an insulated glass unit comprising a first ply comprising a No. 1 surface and a No. 2 surface opposite the No. 1 surface and a second ply comprising a No. 3 surface and a No. 4 surface. The second ply is spaced from the first ply. The first ply and second ply are connected together. A functional coating is applied over the No. 2 surface or the No. 3 surface. The functional coating comprises: a base layer over at least a portion of the No. 2 surface or the No. 3 surface; a metallic layer over at least a portion of the base layer; and a top layer over at least a portion of the metallic layer. The base layer comprises a first film comprising tin oxide in direct contact with the portion of the No. 2 surface or the No. 3 surface and a second film covering the entire portion of the first film.

The invention also relates to a method of making a coated article. A substrate comprising a first surface and a second surface opposite the first surface is provided. A base layer over at least a portion of the first surface is formed. A metallic layer over at least a portion of the base layer is formed. A top layer over at least a portion of the metallic layer is formed. The base layer comprises a first film comprising tin oxide in direct contact with the portion of the first surface and a second film covering the entire portion of the first film.

The invention also relates to a windshield comprising a first ply comprising a No. 1 surface and a No. 2 surface opposite the No. 1 surface and a second ply comprising a No. 3 surface and a No. 4 surface. The second ply is spaced from the first ply. The first ply and second ply are connected together with an interlayer. A functional coating is applied over the No. 2 surface or the No. 3 surface. The functional coating comprises: a base layer over at least a portion of the No. 2 surface or the No. 3 surface; a metallic layer over at least a portion of the base layer; and a top layer over at least a portion of the metallic layer. The base layer comprises a first film comprising tin oxide in direct contact with the portion of the No. 2 surface or the No. 3 surface and a second film covering the entire portion of the first film.

The invention also relates to a method of reducing metal ion migration within a coated article. A glass substrate comprising a first surface and a second surface opposite the first surface is provided. A base layer is formed over at least a portion of the first surface. A metallic layer is formed over at least a portion of the base layer. A top layer is formed over at least a portion of the metallic layer, thereby, forming the coated article. The base layer comprises a first film comprising tin oxide in direct contact with the portion of the first surface and a second film covering the entire portion of the first film. The coated article is heated to a temperature of greater than or equal to 1,185° F. The coated article has reduced metal ion migration after heating to a temperature of greater than or equal to 1,185° F.

BRIEF DESCRIPTION OF THE DRAWINGS

FIG. 4A is a single metal coating comprising a substrate, a base layer, a metallic layer, a primer layer, a top layer, and a protective coating. FIG. 4B is the single metal coating of FIG. 4A depicting the base layer comprising two films, the top layer comprising two films, and a protective coating comprising two films. FIG. 4C is the single metal coating of FIG. 4A depicting the base layer comprising two films, the top layer comprising three films, and a protective coating comprising two films.

FIG. 5A is a double metal coating comprising a substrate, a base layer, a metallic layer, a primer layer, a first middle layer, a second metallic layer, a primer layer, a top layer, and a protective coating. FIG. 5B is the double metal coating of FIG. 5A depicting the base layer comprising two films, the first middle layer comprising three films, the top layer comprising two films, and a protective coating comprising two films. FIG. 5C is the double metal coating of FIG. 5A depicting the base layer comprising three films, the first middle layer comprising three films, the top layer comprising three films, and a protective coating comprising two films.

FIG. 6A is a triple metal coating comprising a substrate, a base layer, a metallic layer, a primer layer, a first middle layer, a second metallic layer, a second primer layer, a second middle layer, a third metallic layer, a third primer layer, a top layer, and a protective coating. FIG. 6B is the triple metal coating of FIG. 6A depicting the base layer comprising two films, the first middle layer comprising three films, the second middle layer comprising three films, the top layer comprising two films, and a protective coating comprising two films. FIG. 6C is the triple metal coating of FIG. 6A depicting the base layer comprising two films, the first middle layer comprising three films, the second middle layer comprising three films, the top layer comprising three films, and a protective coating comprising two films.

FIG. 7A is a quadruple metal coating comprising a substrate, a base layer, a metallic layer, a primer layer, a first middle layer, a second metallic layer, a second primer layer, a second middle layer, a third metallic layer, a third primer layer, a third middle layer, a fourth metallic layer, a fourth primer layer, a top layer, and a protective coating. FIG. 7B is the quadruple metal coating of FIG. 7A depicting the base layer comprising two films, the first middle layer comprising three films, the second middle layer comprising three films, the third middle film comprising three films, the top layer comprising two films, and a protective coating comprising two films. FIG. 7C is the quadruple metal coating of FIG. 7A depicting the base layer comprising two films, the first middle layer comprising three films, the second middle layer comprising three films, the third middle layer comprising three films, the top layer comprising three films, and a protective coating comprising two films.

DESCRIPTION OF THE INVENTION

Figure 1:
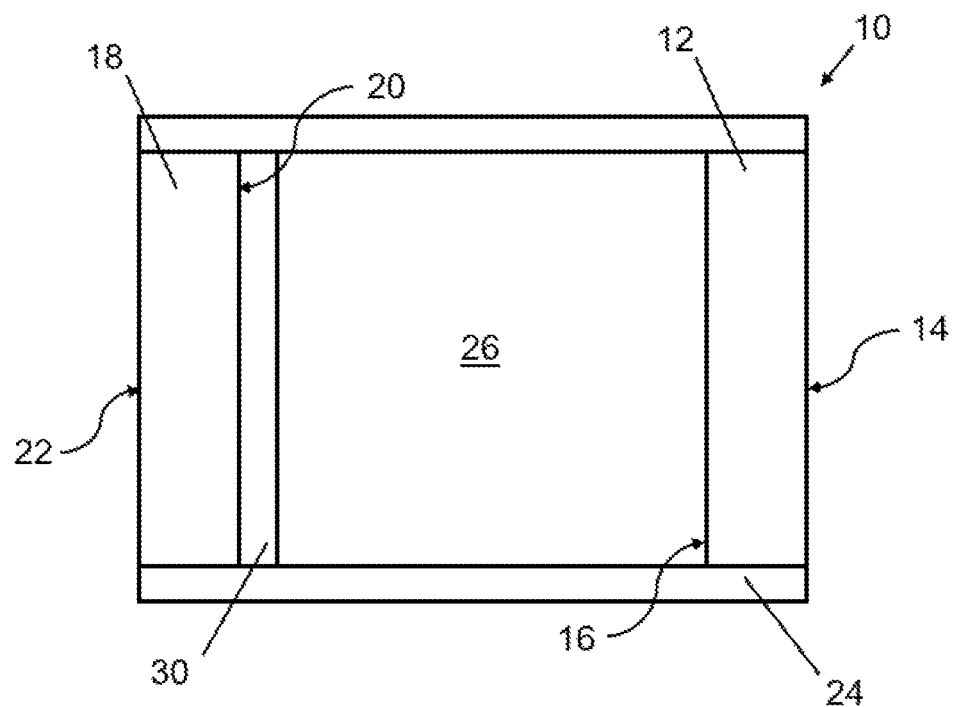
FIG. 1 is a side view (not to scale) of an exemplary insulating glass unit ("IGU") having a coating of the invention.

As used herein, spatial or directional terms, such as "left", "right", "inner", "outer", "above", "below", and the like, relate to the invention as it is shown in the drawing figures. However, it is to be understood that the invention can assume various alternative orientations and, accordingly, such terms are not to be considered as limiting. Further, as used herein, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 3.3, 4.7 to 7.5, 5.5 to 10, and the like. "A" or "an" refers to one or more.

Further, as used herein, the terms "formed over", "deposited over", or "provided over" mean formed, deposited, or provided on but, not necessarily in contact with the surface. For example, a coating layer "formed over" a substrate does not preclude the presence of one or more other coating layers or films of the same or different composition located between the formed coating layer and the substrate. Additionally, all documents, such as, but not limited to, issued patents and patent applications, referred to herein are to be considered to be "incorporated by reference" in their entirety. As used herein, the term "film" refers to a coating region of a desired or selected coating composition. A "layer" can comprise one or more "films", and a "coating" or "coating stack" can comprise one or more "layers". The term "asymmetrical reflectivity" means that the visible light reflectance of the coating from one side is different than that of the coating from the opposite side. The term "critical thickness" means a thickness above which a coating material forms a continuous, uninterrupted layer and below which the coating material forms discontinuous regions or islands of the coating material rather than a continuous layer. The term "subcritical thickness" means a thickness below the critical thickness such that the coating material forms isolated, non-connected regions of the coating material. The term "islanded" means that the coating material is not a continuous layer but, rather, that the material is deposited to form isolated regions or islands.

For purposes of the following discussion, the coated articles described herein may be discussed with reference to use with an architectural transparency, such as, but not limited to, an insulating glass unit (IGU). As used herein, the term "architectural transparency" refers to any transparency located on a building, such as, but not limited to, windows and sky lights. However, it is to be understood that the coated articles described herein are not limited to use with such architectural transparencies but, could be practiced with transparencies in any desired field, such as, but not limited to, laminated or non-laminated residential and/or commercial windows, insulating glass units, and/or transparencies for land, air, space, above water and underwater vehicles. In one aspect or embodiment, the coated articles as described herein are transparencies for use in a vehicle, such as, a window or a sunroof. Therefore, it is to be understood that the specifically disclosed exemplary aspects or embodiments are presented simply to explain the general concepts of the invention, and that the invention is not limited to these specific exemplary embodiments. Additionally, while a typical "transparency" can have sufficient visible light transmission such that materials can be viewed through the transparency, the "transparency" need not be transparent to visible light but, may be translucent or opaque. That is, by "transparent" is meant having visible light transmission of greater than 0% up to 100%.

A non-limiting transparency 10 incorporating features of the invention is illustrated in FIG. 1. The transparency 10 can have any desired visible light, infrared radiation, or ultraviolet radiation transmission and/or reflection.

The exemplary transparency 10 of FIG. 1 is in the form of a conventional insulating glass unit and includes a first ply 12 with a first major surface 14 (No. 1 surface) and an opposed second major surface 16 (No. 2 surface). In the illustrated non-limiting embodiment, the first major surface 14 faces the building exterior, i.e., is an outer major surface, and the second major surface 16 faces the interior of the building. The transparency 10 also includes a second ply 18 having an inner (first) major surface 20 (No. 3 surface) and an outer (second) major surface 22 (No. 4 surface) and spaced from the first ply 12. In some embodiments, the insulated glass unit includes a third ply with a first major surface (No. 5 surface) and an opposed second major surface (No. 6 surface). This numbering of the ply surfaces is in keeping with conventional practice in the fenestration art. The first and second plies 12, 18 can be connected in any suitable manner, such as, by being adhesively bonded to a conventional spacer frame 24. A gap or chamber 26 is formed between the two plies 12, 18. The chamber 26 can be filled with a selected atmosphere, such as, air, or a non-reactive gas such as, argon or krypton gas. A coating 30 (or any of the other coatings described below) is formed over at least a portion of the No. 1 surface 14 or at least a portion of the No. 2 surface 16 or at least a portion of the No. 3 surface 20 or at least a portion of the No. 4 surface 22 or at least a portion of the No. 5 surface or at least a portion of the No. 6 surface. The coating 30 (or any of the other coatings described below) is formed over at least a portion of the No. 2 surface 16 or at least a portion of the No. 3 surface 20.

Examples of insulating glass units are found, for example, in U.S. Pat. Nos. 4,193,228; 4,464,874; 5,088,258; and 5,106,663.

Figure 2:
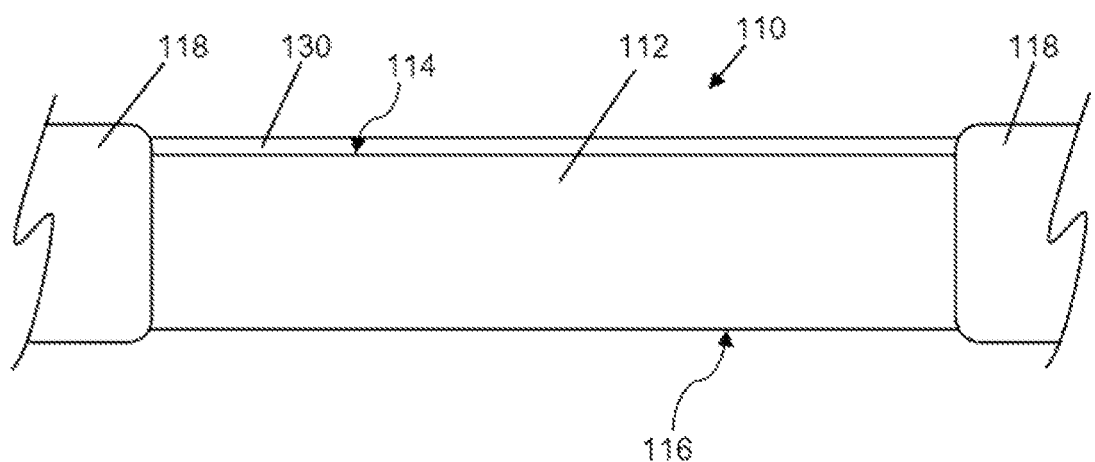
FIG. 2 is a sectional view of an exemplary monolithic transparency having a coating of the invention.

In some embodiments, the coating can be applied to the surface of a monolithic glazing. By "monolithic" is meant having a single structural support or structural member, e.g., having a single substrate. The exemplary transparency of FIG. 2 is in the form of a conventional monolithic transparency 110 for a vehicle, such as a window or sunroof. For clarity, seals, connectors, and opening mechanisms are not shown, nor is the complete vehicle. The transparency includes a first ply 112 with a first major surface 114 (No. 1 surface) and an opposed second major surface 116 (No. 2 surface) mounted in the body of a vehicle 118 (shown in part). In the illustrated non-limiting embodiment, the first major surface 114 faces the vehicle's exterior, and, thus, is an outer major surface, and the second major surface 116 faces the interior of the vehicle. Non-limiting examples of a vehicle body include: an automobile roof in the case of a sunroof, an automobile door or frame in the case of an automobile window, or a fuselage of an airplane. The transparency may be affixed to a mechanism by which the transparency, such as, a car window or sunroof, can be opened and closed, as is broadly known in the vehicular arts. A coating 130, or any of the other coatings described herein, is shown as formed over the No. 1 surface 114, it may be formed over at least a portion of the No. 2 surface 116.

Figure 3:
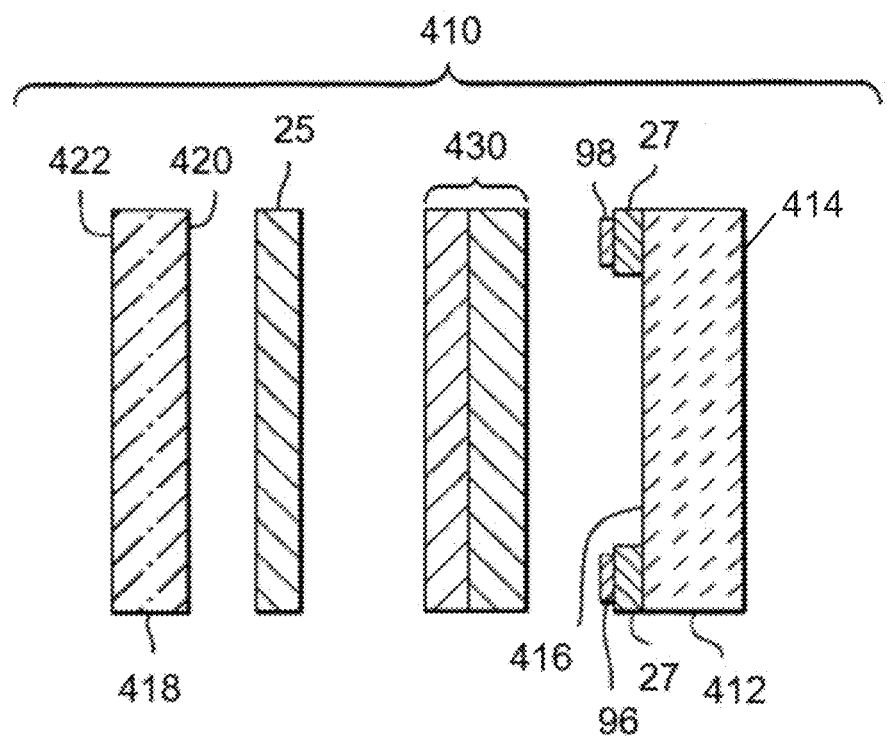
FIG. 3 is a schematic view (not to scale) of a non-limiting windshield.

As seen in FIG. 3, the transparency 410 can be a windshield that includes a first ply or first substrate 412 with a first major surface 414 (No. 1 surface) facing the vehicle exterior, i.e., an outer major surface 414 (No. 1 surface) and an opposed second or inner major surface 416 (No. 2 surface). The windshield transparency 410 also includes a second ply or second substrate 418 having an outer (first) major surface 422 (No. 4 surface) and an inner (second) major surface 420 (No. 3 surface). This numbering of the ply surfaces is in keeping with conventional practice in the automotive art. The first and second plies 412, 418 can be bonded together in any suitable manner, such as, by conventional interlayer 25. Although not required, a conventional edge sealant can be applied to the perimeter of the laminated transparency 410 during and/or after lamination in any desired manner. A decorative band, e.g., an opaque, translucent, or colored shade band 27, such as, a ceramic band, can be provided on a surface of at least one of plies 412, 418, for example around the perimeter of the inner major surface 416 of the first ply 412. A functional coating 430, or any of the other coatings described herein, is formed over at least a portion of one of the plies 412, 418, such as, over the No. 2 surface 416 or No. 3 surface 420.

In the non-limiting embodiment illustrated in FIG. 3, the bus bar assembly includes a first or bottom bus bar 96 and a second or top bus bar 98 formed on the inner surface 416 of the outer ply 412 and separated by a bus bar to bus bar distance D. The bus bars 96, 98 are in electrical contact with the functional coating 430. In one non-limiting embodiment of the invention the bus bars 96, 98 can be positioned at least partially on, or completely on, the decorative band 27, as shown in FIG. 3.

In the broad practice of the invention, the plies 12, 18, 112, 412, 418 of the transparency 10, 110, 410 can be of the same or different materials. The plies 12, 18, 112, 412, 418 can include any desired material having any desired characteristics. For example, one or more of the plies 12, 18, 112, 412, 418 can be transparent or translucent to visible light. By "transparent" is meant having visible light transmission of greater than 0% up to 100%. Alternatively, one or more of the plies 12, 18, 112, 412, 418 can be translucent. By "translucent" is meant allowing electromagnetic energy (e.g., visible light) to pass through but diffusing this energy such that objects on the side opposite the viewer are not clearly visible. Examples of suitable materials include, but are not limited to, plastic substrates (such as, acrylic polymers, such as, polyacrylates; polyalkylmethacrylates, such as, polymethylmethacrylates, polyethylmethacrylates, polypropylmethacrylates, and the like; polyurethanes; polycarbonates; polyalkylterephthalates, such as, polyethyleneterephthalate (PET), polypropyleneterephthalates, polybutyleneterephthalates, and the like; polysiloxane-containing polymers; or copolymers of any monomers for preparing these, or any mixtures thereof); ceramic substrates; glass substrates; or mixtures or combinations of any of the above. For example, one or more of the plies 12, 18, 112, 412, 418 can include conventional soda-lime-silicate glass, borosilicate glass, or leaded glass. The glass can be clear glass. By "clear glass" is meant non-tinted or non-colored glass. Alternatively, the glass can be tinted or otherwise colored glass. The glass can be annealed or heat-treated glass. As used herein, the term "heat treated" means tempered or at least partially tempered. The glass can be of any type, such as, conventional float glass, and can be of any composition having any optical properties, e.g., any value of visible transmission, ultraviolet transmission, infrared transmission, and/or total solar energy transmission. By "float glass" is meant glass formed by a conventional float process in which molten glass is deposited onto a molten metal bath and controllably cooled to form a float glass ribbon. Examples of float glass processes are disclosed in U.S. Pat. Nos. 4,466,562 and 4,671,155.

The plies 12, 18, 112, 412, 418 can each comprise, for example, clear float glass or can be tinted or colored glass or one ply 12, 18, 412, 418 can be clear glass and the other ply 12, 18, 412, 418 colored glass. Although not limiting, examples of glass suitable for the first ply 12, 412 and/or second ply 18, 418 are described in U.S. Pat. Nos. 4,746, 347; 4,792,536; 5,030,593; 5,030,594; 5,240,886; 5,385, 872; and 5,393,593. The plies 12, 18, 112, 412, 418 can be of any desired dimensions, e.g., length, width, shape, or thickness. In one exemplary automotive transparency, the first and second plies can each be 1 mm to 10 mm thick, such as, 1 mm to 8 mm thick, such as, 2 mm to 8 mm, such as, 3 mm to 7 mm, such as, 5 mm to 7 mm, such as, 6 mm thick.

In non-limiting embodiments of the coated articles described herein, the coating 30, 130, 430 of the invention is deposited over at least a portion of at least one major surface of one of the glass plies 12, 18, 112, 412, 418. In the example according to FIG. 1, the coating 30 is formed over at least a portion of the inner surface 20 of the inboard glass ply 18; additionally or alternatively, it is to be understood that in non-limiting examples consistent with the present disclosure a solar control coating may be formed over at least a portion of the outer surface 22 of the inboard glass ply 18. As used herein, the term "solar control coating" refers to a coating comprised of one or more layers or films that affect the solar properties of the coated article, such as, but not limited to, the amount of solar radiation, for example, visible, infrared, or ultraviolet radiation, reflected from, absorbed by, or passing through the coated article; shading coefficient; emissivity, etc. The solar control coating 30 can block, absorb, or filter selected portions of the solar spectrum, such as, but not limited to, the IR, UV, and/or visible spectrums.

The coatings described herein, such as, the solar control coatings 30, 130, 430 can be deposited by any useful method, such as, but not limited to, conventional chemical vapor deposition (CVD) and/or physical vapor deposition (PVD) methods. Examples of CVD processes include spray pyrolysis. Examples of PVD processes include electron beam evaporation and vacuum sputtering (such as, magnetron sputter vapor deposition (MSVD)). Other coating methods could also be used, such as, but not limited to, sol-gel deposition, slot die coating deposition, or printing depositions, such as, screen printing or ink jet printing. In one non-limiting embodiment, the coating 30, 130, 430 is deposited by MSVD. Examples of MSVD coating devices and methods will be well understood by one of ordinary skill in the art and are described, for example, in U.S. Pat. Nos. 4,379,040; 4,861,669; 4,898,789; 4,898,790; 4,900,633; 4,920,006; 4,938,857; 5,328,768; and 5,492,750.

The coated article comprises a substrate 210. Substrate 210 may include any desired properties, and be of any desired thickness. The substrate 210 may comprise any suitable transparent material or materials, such as, for example and without limitation, the polymers, glass, and/or ceramic substrates described above in the context of plies 12, 18, 112, 412, and 418. In non-limiting examples, substrate 210 may comprise a glass substrates as described above in reference to plies 12, 18, 112, 412, 418 as shown in FIG. 1, 2, or 3. However, it is to be understood that the present invention may be applied to other substrates as well, such as, those used in solar cells.

The functional coating 30, 130, 430 may include a transparent conductive oxide (TCO), for example and without limitation, as disclosed in U.S. Patent Application Publication No 2019/0043640. The functional coating 30, 130, 430 can include the stack as described in any of U.S. Patent Application Publication Nos. 2017/0341977, 2014/0272453, 2011/0228715, and/or U.S. patent application Ser. No. 15/669,414, or any portion thereof.

Figure 4A:
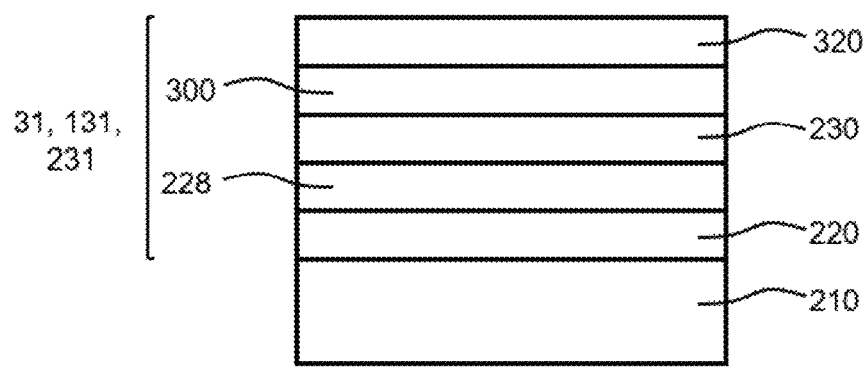
FIGS. 4A, 4B, and 4C is a sectional view (not to scale) of a single metal coating according to an example of the invention.
Figure 4B:
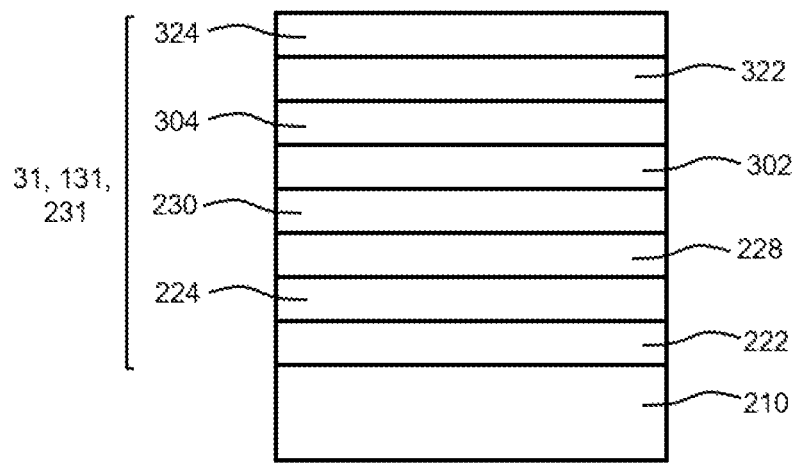
Figure 4C:
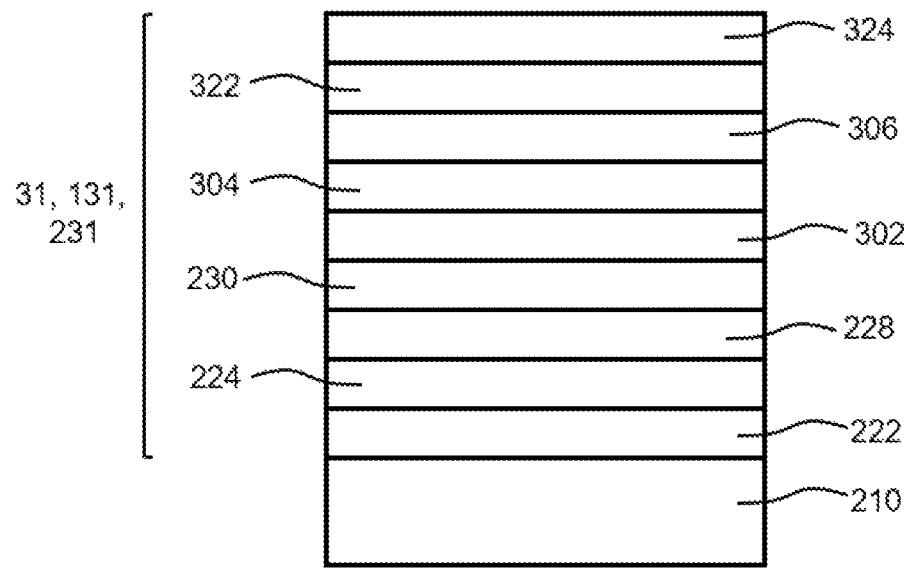
Figure 5A:
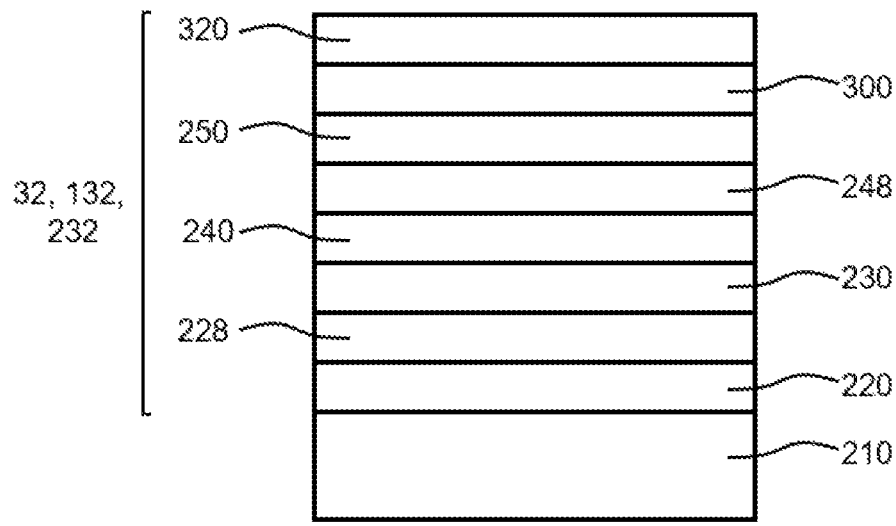
FIGS. 5A, 5B, and 5C is a sectional view (not to scale) of a double metal coating according to an example of the invention.
Figure 5B:
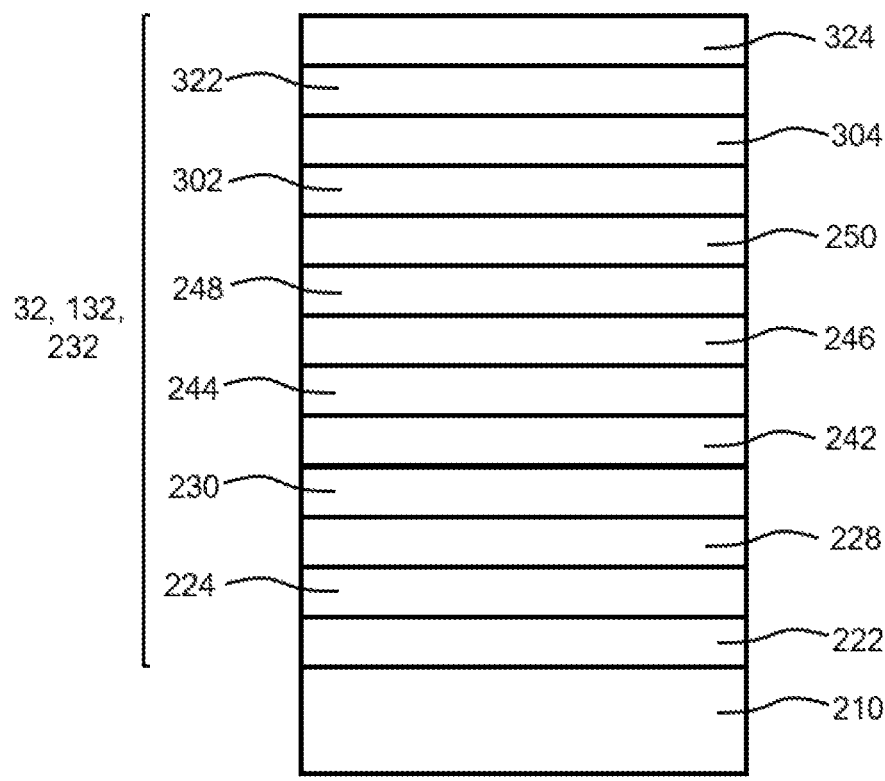
Figure 5C:
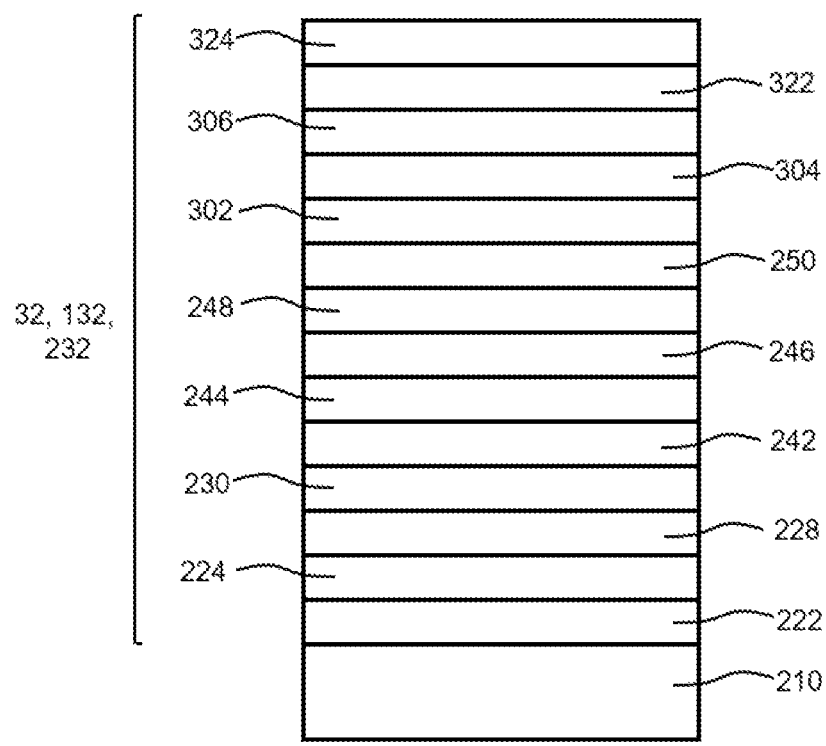
Figure 6A:
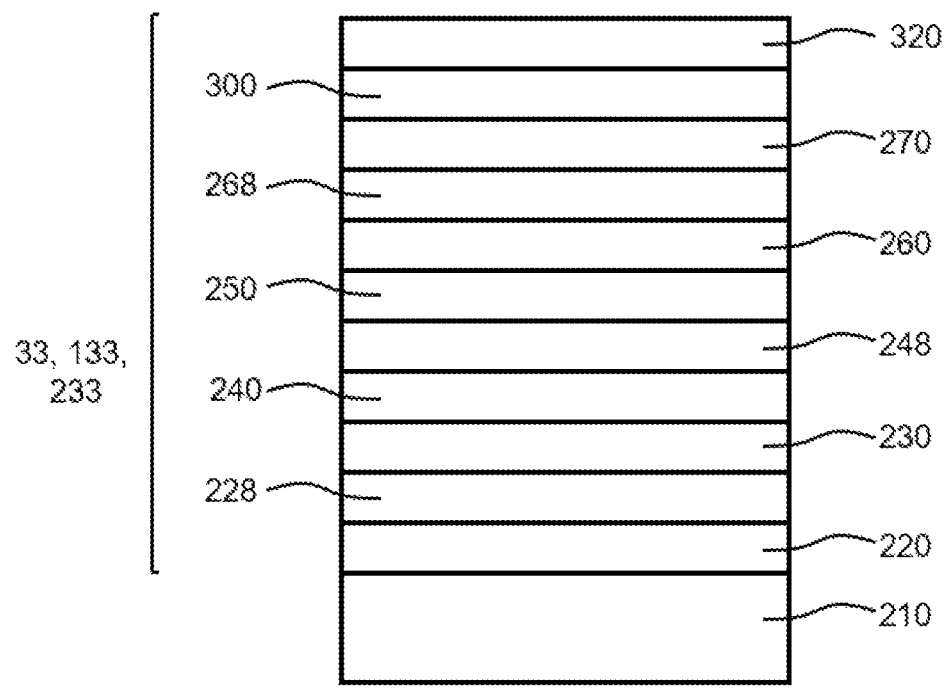
FIGS. 6A, 6B, and 6C is a sectional view (not to scale) of a triple metal coating according to an example of the invention.
Figure 6B:
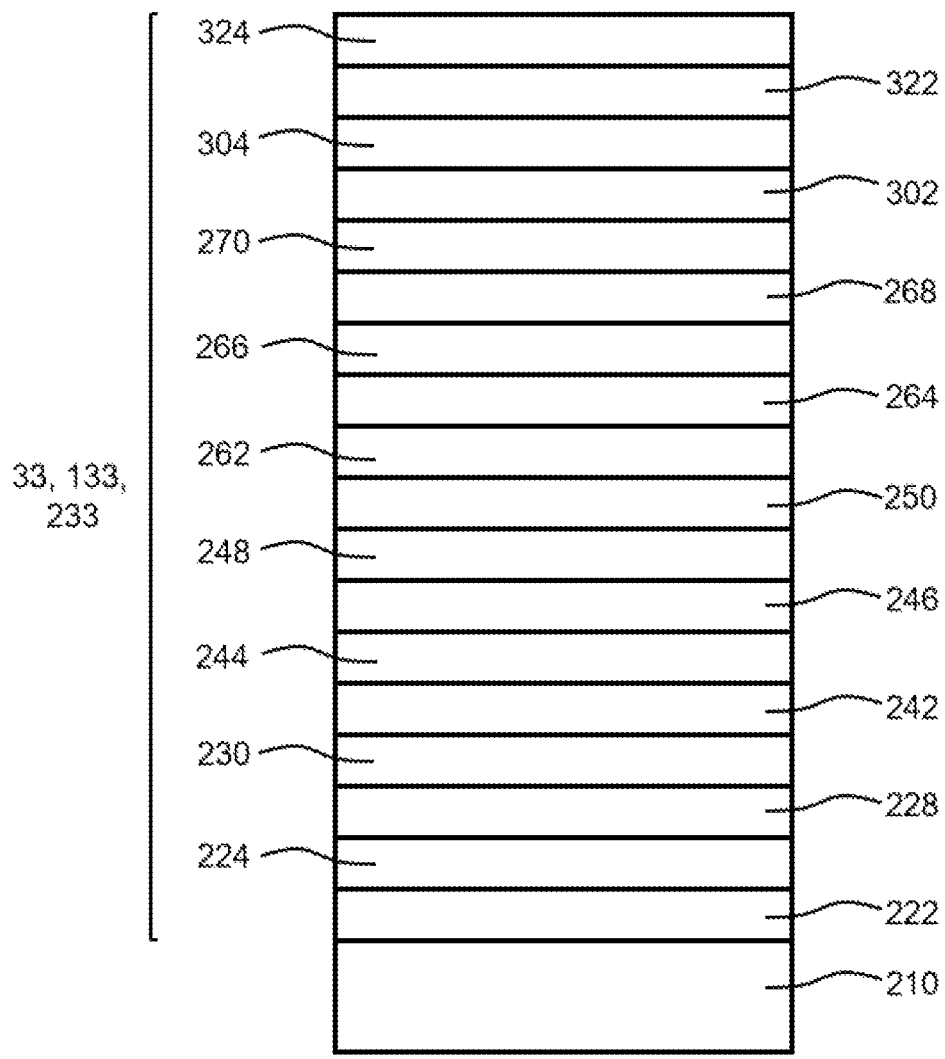
Figure 6C:
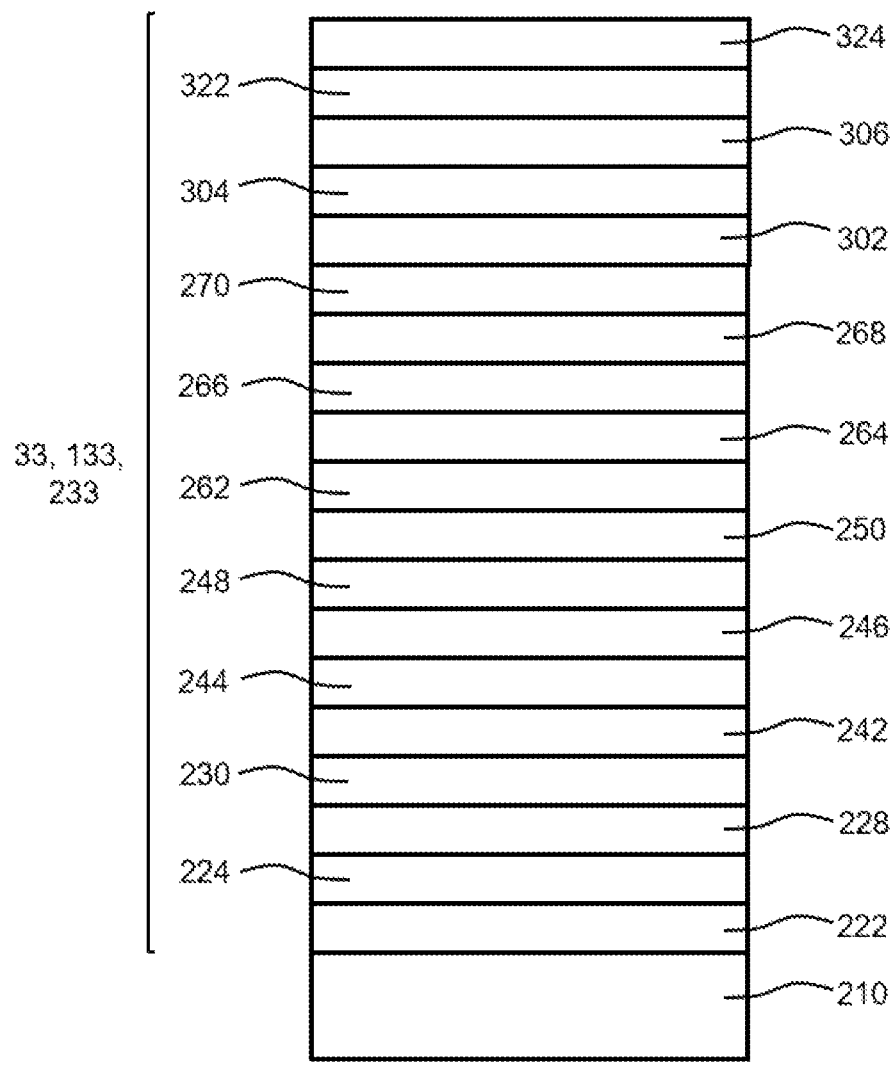
Figure 7A:
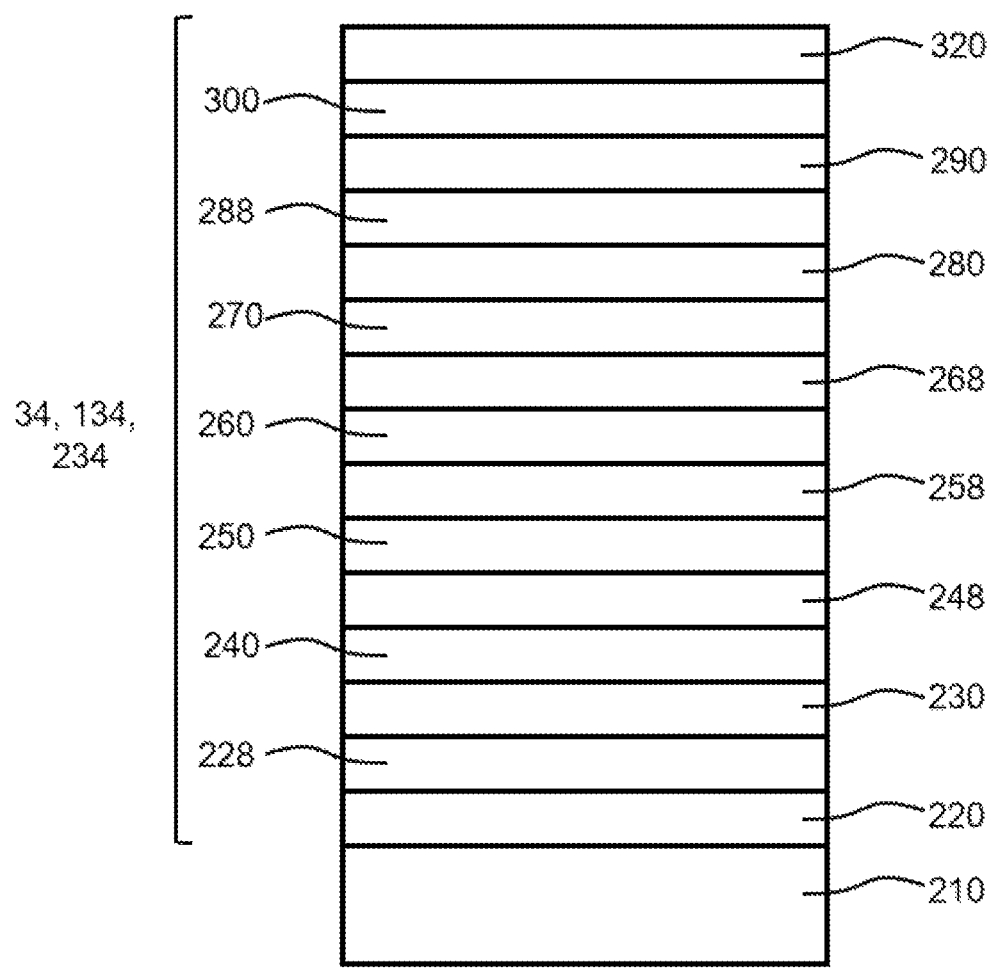
FIGS. 7A, 7B, and 7C is a sectional view (not to scale) of a quadruple coating according to an example of the invention.
Figure 7B:
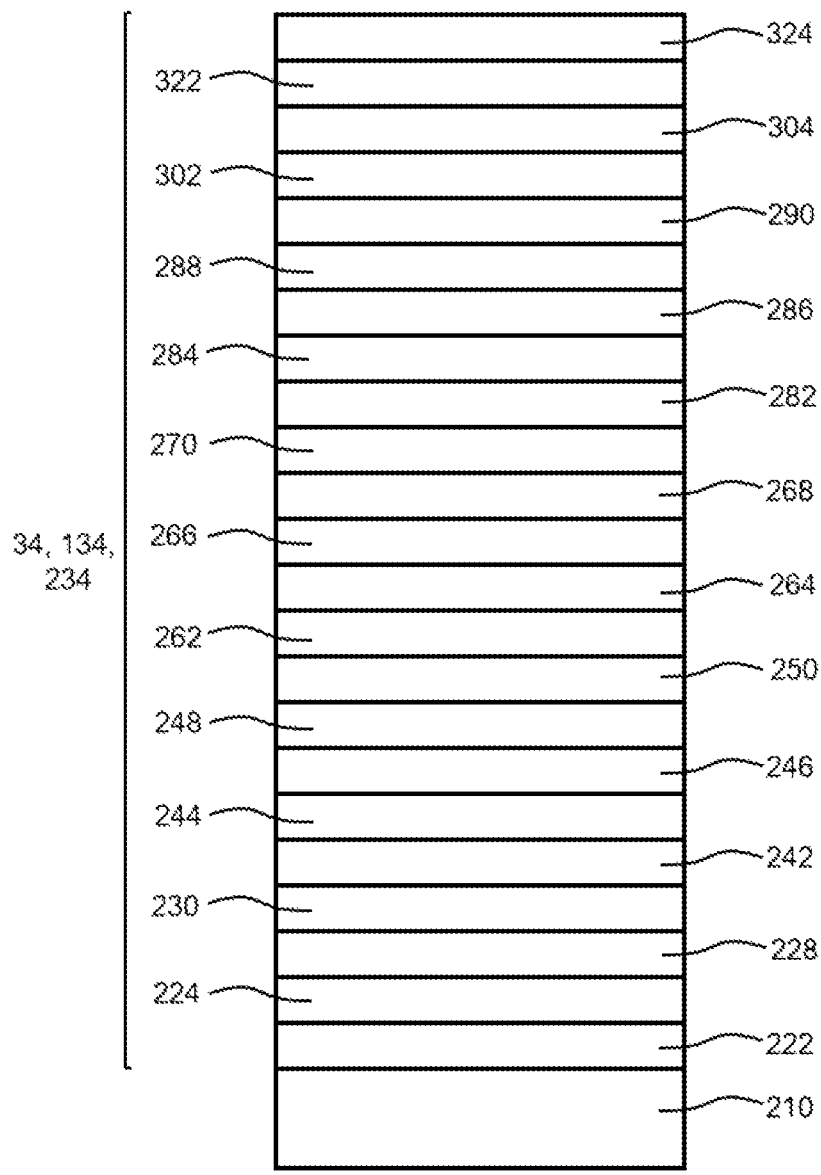
Figure 7C:
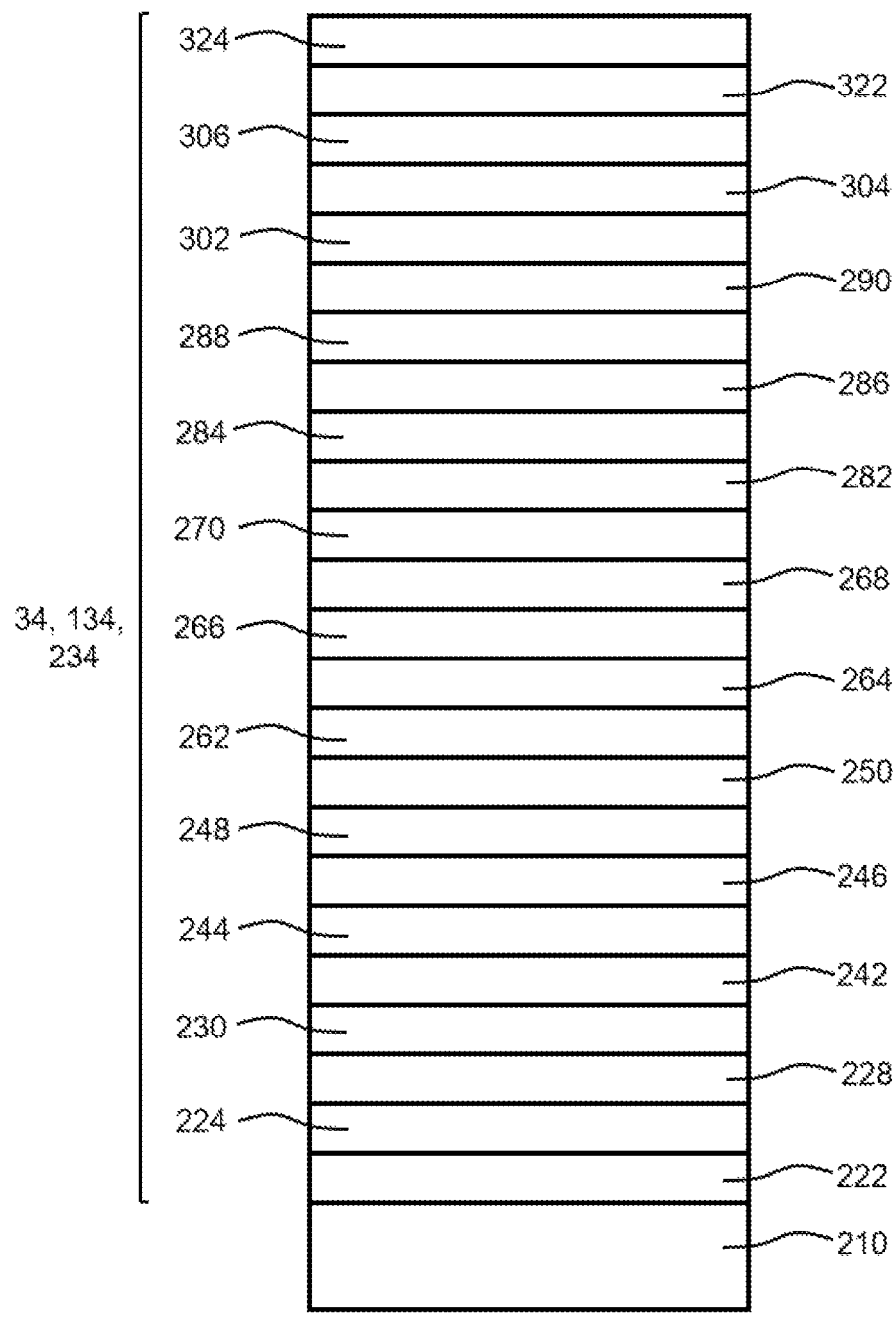

The coating 30, 130, 430 can be a single metal coating 31, 131, 231 (e.g., one metallic layer), or a double metal coating 32, 132, 232 (e.g., two metallic layers), or a triple metal coating 33, 133, 233 (e.g., three metallic layers), or a quadruple metal coating 34, 134, 234 (e.g., four metallic layers). Exemplary non-limiting coatings suitable for the single metal coating 31, 131, 231 is shown in FIGS. 4A-4C. Exemplary non-limiting coatings suitable for the double metal coating 32, 132, 232 is shown in FIGS. 5A-5C. Exemplary non-limiting coatings suitable for the triple metal coating 33, 133, 233 is shown in FIGS. 6A-6C. Exemplary non-limiting coatings suitable for the quadruple metal coating 34, 134, 234 is shown in FIGS. 7A-7C.

An exemplary coating 30, 130, 430 includes one metallic layer (i.e., a single metal coating 31, 131, 231), as shown in FIG. 4A. The single metal coating 31, 131, 231 includes a base layer 220 positioned over and in direct contact with the substrate 210 (e.g., the first surface of the substrate in a monolithic article; or in cases of an IGU, the No. 2 surface 16 of the first ply 12, or the No. 3 surface 20 of the second ply 18; or in cases of a windshield, the No. 2 surface 416 of the first ply 412 or the No. 3 surface 420 of the second ply 418). The base layer 220 may be positioned over and in direct contact with a portion or an entire substrate 210 (e.g. the first surface of the substrate in a monolithic article; or in cases of an IGU, the No. 2 surface 16 of the first ply 12, or the No. 3 surface 20 of the second ply 18; or in cases of a windshield, the No. 2 surface 416 of the first ply 412 or the No. 3 surface 420 of the second ply 418). A metallic layer 228 is positioned over or in direct contact with at least a portion of the base layer 220. An optional first primer layer 230 may be positioned over or in direct contact with at least a portion of the metallic layer 228. A top layer 300 is positioned over or in direct contact with at least a portion of the optional first primer layer 230 or the metallic layer 228. An optional outermost protective coating 320 may be positioned over or in direct contact with at least a portion of the top layer 300.

An exemplary coating 30, 130, 430 includes two metallic layers (i.e., a double metal coating 32, 132, 232), as shown in FIG. 5A. The double metal coating 32, 132, 232 includes a base layer 220 positioned over and in direct contact with the substrate 210 (e.g., the first surface of the substrate in a monolithic article; or in cases of an IGU, the No. 2 surface 16 of the first ply 12, or the No. 3 surface 20 of the second ply 18; or in cases of a windshield, the No. 2 surface 416 of the first ply 412 or the No. 3 surface 420 of the second ply 418). The base layer 220 may be positioned over and in direct contact with a portion of or an entire substrate 210 (e.g. the first surface of the substrate in a monolithic article; or in cases of an IGU, the No. 2 surface 16 of the first ply 12, or the No. 3 surface 20 of the second ply 18; or in cases of a windshield, the No. 2 surface 416 of the first ply 412 or the No. 3 surface 420 of the second ply 418). A metallic layer 228 is positioned over or in direct contact with at least a portion of the base layer 220. An optional first primer layer 230 may be positioned over or in direct contact with at least a portion of the metallic layer 228. A first middle layer 240 is positioned over at least a portion of the optional first primer layer 230 or the metallic layer 228. A second metallic layer 248 is positioned over or in direct contact with at least a portion of the first middle layer 240. An optional second primer layer 250 is positioned over or in direct contact with at least a portion of the second metallic layer 248. A top layer 300 is positioned over or in direct contact with at least a portion of the optional second primer layer 250 or the second metallic layer 248. An optional outermost protective coating 320 may be positioned over or in direct contact with at least a portion of the top layer 300.

An exemplary coating 30, 130, 430 includes three metallic layers (i.e., a triple metal coating 33, 133, 233), as shown in FIG. 6A. The triple metal coating 33, 133, 233 includes a base layer 220 positioned over and in direct contact with the substrate 210 (e.g., the first surface of the substrate in a monolithic article; or in cases of an IGU, the No. 2 surface 16 of the first ply 12, or the No. 3 surface 20 of the second ply 18; or in cases of a windshield, the No. 2 surface 416 of the first ply 412 or the No. 3 surface 420 of the second ply 418). The base layer 220 may be positioned over and in direct contact with a portion of or an entire substrate 210 (e.g. the first surface of the substrate in a monolithic article; or in cases of an IGU, the No. 2 surface 16 of the first ply 12, or the No. 3 surface 20 of the second ply 18; or in cases of a windshield, the No. 2 surface 416 of the first ply 412 or the No. 3 surface 420 of the second ply 418). A metallic layer 228 is positioned over or in direct contact with at least a portion of the base layer 220. An optional first primer layer 230 may be positioned over or in direct contact with at least a portion of the metallic layer 228. A first middle layer 240 is positioned over at least a portion of the optional first primer layer 230 or the metallic layer 228. A second metallic layer 248 is positioned over or in direct contact with at least a portion of the first middle layer 240. An optional second primer layer 250 is positioned over or in direct contact with at least a portion of the second metallic layer 248. A second middle layer 260 is positioned over or in direct contact with at least a portion of the optional second primer layer 250 or the second metallic layer 248. A third metallic layer 268 is positioned over or in direct contact with at least a portion of the second middle layer 260. An optional third primer layer 270 is positioned over or in direct contact with at least a portion of the third metallic layer 268. A top layer 300 is positioned over or in direct contact with at least a portion of the optional third primer layer 270 or the third metallic layer 268. An optional outermost protective coating 320 may be positioned over or in direct contact with at least a portion of the top layer 300.

An exemplary coating 30, 130, 430 includes four metallic layers (i.e., a quadruple metal coating 34, 134, 234), as shown in FIG. 7A. The quadruple metal coating 34, 134, 234 includes a base layer 220 positioned over and in direct contact with the substrate 210 (e.g., the first surface of the substrate in a monolithic article; or in cases of an IGU, the No. 2 surface 16 of the first ply 12, or the No. 3 surface 20 of the second ply 18; or in cases of a windshield, the No. 2 surface 416 of the first ply 412 or the No. 3 surface 420 of the second ply 418). The base layer 220 may be positioned over and in direct contact with the entire substrate 210 (e.g. the first surface of the substrate in a monolithic article, the No. 2 surface 16 of the first ply 12, or the No. 3 surface 20 of the second ply 18; or in cases of a windshield, the No. 2 surface 416 of the first ply 412 or the No. 3 surface 420 of the second ply 418). A metallic layer 228 is positioned over or in direct contact with at least a portion of the base layer 220. An optional first primer layer 230 may be positioned over or in direct contact with at least a portion of the metallic layer 228. A first middle layer 240 is positioned over at least a portion of the optional first primer layer 230 or the metallic layer 228. A second metallic layer 248 is positioned over or in direct contact with at least a portion of the first middle layer 240. An optional second primer layer 250 is positioned over or in direct contact with at least a portion of the second metallic layer 248. A second middle layer 260 is positioned over or in direct contact with at least a portion of the optional second primer layer 250 or the second metallic layer 248. A third metallic layer 268 is positioned over or in direct contact with at least a portion of the second middle layer 260. An optional third primer layer 270 is positioned over or in direct contact with at least a portion of the third metallic layer 268. A third middle layer 280 is positioned over or in direct contact with at least a portion of the optional third primer layer 270 or third metallic layer 268. A fourth metallic layer 288 is positioned over or in direct contact with at least a portion of the third middle layer 280. An optional fourth primer layer 290 is positioned over or in direct contact with at least a portion of the fourth metallic layer 288. A top layer 300 is positioned over or in direct contact with at least a portion of the optional fourth primer layer 290 or the fourth metallic layer 288. An optional outermost protective coating 320 may be positioned over or in direct contact with at least a portion of the top layer 300.

Any of the metallic layers described herein can be continuous or discontinuous.

Exemplary non-limiting functional coatings 30, 130, 430 of the invention is shown in FIGS. 4A-4C, 5A-5C, 6A-6C, and 7A-7C. This functional coating 30, 130, 430 includes a base layer 220 positioned over and in direct contact with the substrate 210. The base layer 220 includes a first film 222 that prevents the diffusion of zinc, sodium, calcium, magnesium, alkali metal elements, alkaline earth elements, or combinations thereof. As shown in FIGS. 4B-4C, 5B-5C, 6B-6C, and 7B-7C, the base layer 220 includes a first film 222 positioned over and in direct contact with the substrate 210 and a second film 224 positioned over and in direct contact with the first film such that the second film 224 does not contact the substrate 210.

The functional coating 30, 130, 430 comprises a base layer 220 positioned over and in direct contact with the substrate. The base layer 220 includes a first film 222 positioned over and in direct contact with the substrate 210 and a second film 224 positioned over and in direct contact with the entire first film 222. The first film 222 may be positioned over and in direct contact with a portion of the substrate or the entire substrate 210. The second film 222 does not contact the substrate 210. The base layer 220 can be transparent to visible light.

The first film 222 of the base layer 220 is a film comprising tin oxide. The tin oxide can be deposited in an oxygen ($O_2$) environment from a tin target or from a tin target that includes other materials to improve the sputtering characteristics of the target. For example, the $O_2$ flow rate (i.e., concentration of $O_2$ in the atmosphere for the chamber where the material is being deposited) can be up to 80% $O_2$, such as, 80% $O_2$, 75% $O_2$, or 70% $O_2$. The remainder of the atmosphere can be an inert gas, such as, argon. The tin oxide can be obtained from magnetron sputtering vacuum deposition from a target of tin or a target of tin and zinc. For example, the tin target can include a small amount (e.g., up to 20 wt. %, up to 15 wt. %, up to 10 wt. %, or up to 5 wt. %) of zinc. In which case, the resultant tin oxide film would include a small percentage of zinc oxide, e.g., up to 20 wt. % zinc oxide, e.g., up to 10 wt. % zinc oxide, e.g., up to 5 wt. % zinc oxide. A coating layer deposited from a tin target having up to from 0 wt. % to 20 wt. % zinc is referred to herein as "a tin oxide film". The first film 222 of the base layer 220 may be a tin oxide film where tin is substantially the only metal in the first film 222. As used herein, "substantially free" means that the tin oxide film contains less than 0.5 wt. % of additional metals other than tin. The tin oxide film 222 may include 80 wt. % tin oxide and 20 wt. % zinc oxide. The tin-zinc oxide film 222 may include 90% tin oxide and 10 wt. % zinc oxide.

The first film 222 of the base layer 220 can comprise a total thickness of from 10 nm to 45 nm, such as, from 15 nm to 40 nm, such as, from 20 nm to 35 nm, such as, from 22 to 30 nm.

The second film 224 of the base layer 220 can comprise antireflective materials and/or dielectric materials, such as, but not limited to, metal oxides, oxides of metal alloys, nitrides, oxynitrides, or mixtures thereof. Examples of suitable metal oxides for the second film 224 of the base layer 220 include oxides of titanium, hafnium, zirconium, niobium, zinc, bismuth, lead, indium, tin, aluminum, silicon and mixtures thereof. These metal oxides can have small amounts of other materials, such as, manganese in bismuth oxide, tin in indium oxide, etc. Additionally, oxides of metal alloys or metal mixtures can be used, such as, oxides containing zinc and tin (e.g., zinc stannate, defined below), oxides of indium-tin alloys, oxides containing zinc and aluminum, silicon nitrides, silicon aluminum nitrides, or aluminum nitrides. Further, doped metal oxides, such as, antimony or indium doped tin oxides or nickel or boron doped silicon oxides, can be used.

The second film 224 of the base layer 220 can be a zinc/tin alloy oxide. By "zinc/tin alloy oxide" is meant both true alloys, and mixtures of the oxides. Zinc oxide can be deposited from a zinc target that includes other materials to improve the sputtering characteristics of the target. As such, the zinc/tin alloy oxide can be obtained from magnetron sputtering vacuum deposition from a target of zinc and tin. For example, the zinc target can include a small amount (e.g., up to 20 wt. %, up to 15 wt. %, up to 10 wt. %, or up to 5 wt. %) of tin to improve sputtering. In which case, the resultant zinc oxide film would include a small percentage of tin oxide, e.g., up to 10 wt. % tin oxide, e.g., up to 5 wt. % tin oxide. A coating layer deposited from a zinc target having up to 10 wt. % tin (added to enhance the conductivity of the target) is referred to herein as "a zinc oxide film" even though a small amount of tin may be present. One non-limiting target can comprise zinc and tin in proportions of from 5 wt. % to 95 wt. % zinc and from 95 wt. % to 5 wt. % tin, such as, from 10 wt. % to 90 wt. % zinc and from 90 wt. % to 10 wt. % tin. However, other ratios of zinc to tin could also be used.

The second film 224 of the base layer 220 can comprise a film of zinc oxide or aluminum zinc oxide film ($Al_xZn_{1-x}$ oxide). By "aluminum/zinc alloy oxide" is meant both true alloys, and mixtures of the oxides. As such, the aluminum/zinc alloy oxide can be obtained from magnetron sputtering vacuum deposition from a target of zinc and aluminum and can include a small of amount (e.g. less than 10 wt. %, such as, greater than 0 to 5 wt. %) of tin to improve sputtering. In which case, the resultant aluminum zinc oxide film would include a small percentage of tin oxide, e.g. 0 wt. % to less than 10 wt. %, e.g., 0 wt. % to 5 wt. % tin oxide. The second film 224 of the base layer 220 can comprise $Al_xZn_{1-x}$ oxide, where x is within the range of 1 wt. % to 25 wt. %, such as, 1 wt. % to 15 wt. %, such as, 1 wt. % to 10 wt. %, such as, 2 wt. % to 5 wt. %. In one non-limiting embodiment, x is 3 wt. %.

The second film 224 of the base layer 220 can comprise a total thickness of from 5 nm to 20 nm, such as, from 8 nm to 20 nm, such as, from 10 nm to 15 nm.

The first film 222 of the base layer 220 comprises tin oxide positioned over and in direct contact with the substrate 210 and the second film 224 of the base layer 220 comprises zinc oxide positioned over and in direct contact with the first film 222, such that the second film 224 does not contact the substrate 210.

The base layer 220 may comprise three films. The base layer 220 includes a first film 222 positioned over and in direct contact with the substrate 210, a second film 224 positioned over and in direct contact with the entire first film 222, and a third film positioned over and in direct contact with the entire second film 224.

The first film 222 of the base layer 222 comprises tin oxide positioned over and in direct contact with the substrate 210, the second film 224 comprises zinc stannate positioned over and in direct contact with the first film 222, such that the second film 224 does not contact the substrate 210, and the third film comprises zinc oxide positioned over and in direct contact with the second film 224.

The base layer 220 can comprise a total thickness (e.g., combined thickness of the first and second films 222, 224) of from 20 nm to 50 nm, such as, from 25 nm to 45 nm, such as, from 30 nm to 45 nm.

A metallic layer 228 can be deposited over at least a portion of the base layer 220. The metallic layer 228 can include a reflective metal, such as, but not limited to, metallic gold, copper, palladium, aluminum, silver, or mixtures, alloys, or combinations thereof. In one embodiment, the metallic layer 228 comprises a metallic silver layer. The metallic layer 228 is a continuous layer. By "continuous layer" is meant that the coating forms a continuous film of the material and not isolated coating regions.

The first metallic layer 228 can have a thickness in the range of from 5 nm to 25 nm, such as, from 8 nm to 23 nm, such as, from 8 nm to 20 nm, such as, from 8 nm to 17 nm.

A first primer layer 230 can be located over the metallic layer 228. The first primer layer 230 can be a single film or a multiple film layer. The first primer layer 230 can include an oxygen-capturing material that can be sacrificial during the deposition process to prevent degradation or oxidation of the metallic layer 228 during the sputtering process or subsequent heating processes. The first primer layer 230 can also absorb at least a portion of electromagnetic radiation, such as, visible light, passing through the functional coating 30, 130, 430. Examples of materials useful for the first primer layer 230 include titanium, silicon, silicon dioxide, silicon nitride, silicon oxynitride, nickel, zirconium, aluminum, cobalt, chromium, titanium, aluminum, an alloy thereof, or a mixture thereof. In one non-limiting embodiment, the first primer layer 230 comprises titanium, titanium and aluminum, or zinc and aluminum, which are deposited as a metal and at least a portion of the titanium, or titanium and aluminum, or zinc and aluminum are subsequently oxidized. In another embodiment, the primer layer 230 comprises a nickel-chromium alloy, such as, Inconel. In another embodiment, the primer layer 230 comprises a cobalt-chromium alloy, such as, Stellite®.

The first primer layer 230 can have a thickness in the range of from 0.5 nm to 5 nm, such as, from 1 nm to 4 nm, such as, from 1 nm to 2.5 nm.

A first middle layer 240 is located over at least a portion of the metallic layer 228 (e.g., over the first primer layer 230). The first middle layer 240 can comprise one or more metal oxide or metal alloy oxide-containing films, such as, those described above with respect to the second film 224 of the base layer 220. For example, the first middle layer 240 can include a first film 242 comprising a metal oxide, e.g., a zinc oxide or aluminum zinc oxide, deposited over at least a portion of the first primer layer 230, a second film 244 comprising a metal oxide, e.g., a zinc stannate film over at least a portion of the first film 242, and a third film 246 comprising a metal oxide, e.g., a zinc oxide film or aluminum zinc oxide film, over at least a portion of the second film 244.

The second film 244 of the first middle layer 240 can comprise a film of zinc stannate. By "zinc stannate" is meant a composition of $Zn_xSn_{1-x}O_{2-x}$ (Formula 1) where "x" varies in the range of greater than 0 to less than 1. For instance, "x" can be greater than 0 and can be any fraction or decimal between greater than 0 to less than 1. For example, where x=⅔, Formula 1 is $Zn_{2/3}Sn_{1/3}O_{4/3}$, which is more commonly described as "$Zn_2SnO_4$". A zinc stannate-containing film has one or more of the forms of Formula 1 in a predominant amount in the layer.

In one example, both of the first and third films 242, 246 are present and each has a thicknesses in the range of from 1 nm to 20 nm, such as, from 5 nm to 20 nm, such as, from 6 nm to 15 nm, such as, from 8 nm to 10 nm. The second film 244 can have a thickness in the range of from 5 nm to 80 nm, such as, 5 nm to 70 nm, such as, from 10 nm to 70 nm, such as, from 20 nm to 70 nm, such as, from 30 to 70 nm, such as, from 50 nm to 70 nm.

The first middle layer 240 can comprise a total thickness (e.g., the combined thicknesses of the films) in the range of from 20 nm to 100 nm, such as, from 20 nm to 85 nm, such as, from 25 nm to 80 nm.

A second metallic layer 248 can be formed over a least a portion of the first middle layer. The second metallic layer 248 can include a reflective metal, such as, but not limited to, metallic gold, copper, palladium, aluminum, silver, or mixtures, alloys, or combinations thereof. In one embodiment, the second metallic layer 248 comprises a metallic silver layer.

In one embodiment, the second metallic layer 248 is a continuous layer formed over at least a portion of the first middle layer 240. The second metallic layer 248 is a continuous layer having a total thickness of from 5 nm to 30 nm, such as, from 10 nm to 20 nm, such as, from 10 nm to 15 nm, or such as, from 10 nm to 12 nm.

In another embodiment, the second metallic layer 248 is a discontinuous layer, having a subcritical thickness, formed over at least a portion of the first middle layer 240. The metallic material, such as, but not limited to, metallic gold, copper, palladium, aluminum, silver, or mixtures, alloys, or combinations thereof, is applied at a subcritical thickness such that isolated regions or islands of the material are formed, rather than a continuous layer of the material. For silver, it has been determined that the critical thickness is less than 5 nm, such as, less than 4 nm, such as, less than 3 nm, such as, less than 2.5 nm. For silver, the transition between a continuous layer and a subcritical layer occurs in the range of 2.5 nm to 5 nm. For copper, it has been determined that the effective thickness is at most 9 nm; e.g., 5 nm; 4 nm; e.g., 3.6 nm, e.g., 2.6 nm; e.g., 2 nm; e.g., 1.7 nm; and at least 0.1 nm; e.g., 0.2 nm; e.g. 0.3 nm; e.g. 0.4 nm; e.g. 0.5 nm; e.g. 0.6 nm; e.g. 0.7 nm. It is estimated that copper, gold, and palladium would exhibit similar subcritical behavior in this range. In one non-limiting embodiment, the second metallic layer 248 comprises islanded silver with the islands having an effective thickness of at most 7 nm, e.g. at most 4 nm, e.g., at most 3.5 nm, e.g., at most 3 nm, e.g., at most 2.5 nm, e.g., at most 2 nm; e.g., at most 1.7 nm; and at least 0.1 nm; e.g., at least 0.2 nm; e.g., at least 0.4 nm; e.g., at least 0.5 nm; e.g. at least 0.7 nm; e.g., at least 1 nm. In another embodiment, the second metallic layer 248 comprises copper with the islands having an effective thickness is at most 9 nm; e.g., 5 nm; 4 nm; e.g., 3.6 nm, e.g., 2.6 nm; e.g., 2 nm; e.g., 1.7 nm; and at least 0.1 nm; e.g., 0.2 nm; e.g. 0.3 nm; e.g. 0.4 nm; e.g. 0.5 nm; e.g. 0.6 nm; e.g. 0.7 nm; and, optionally, silver with islands having an effective thickness of at most 7 nm, e.g. at most 4 nm, e.g., at most 3.5 nm, e.g., at most 3 nm, e.g., at most 2.5 nm, e.g., at most 2 nm; e.g., at most 1.7 nm; and at least 0.1 nm; e.g., at least 0.2 nm; e.g., at least 0.4 nm; e.g., at least 0.5 nm; e.g. at least 0.7 nm; e.g., at least 1 nm. The second metallic layer 248 absorbs electromagnetic radiation according to the Plasmon Resonance Theory. This absorption depends at least partly on the boundary conditions at the interface of the metallic islands. The second metallic layer 248 is not an infrared reflecting layer, like the metallic layer 248. It is estimated that for silver and copper, the metallic islands or balls of silver metal and copper metal deposited below the subcritical thickness can have a height of about 2 nm to 7 nm, such as, 5 nm to 7 nm. It is estimated that if the subcritical metal layer could be spread out uniformly, it would have a thickness of about 1.1 nm. It is estimated that optically, the discontinuous metal layer behaves as an effective layer thickness of 2.6 nm. Depositing the discontinuous metallic layer over zinc stannate rather than zinc oxide or aluminum zinc oxide appears to increase the visible light absorbance of the coating, e.g., of the discontinuous metallic layer.

A second primer layer 250 can be located over the second metallic layer 248. The second primer layer 250 can be a single film or a multiple film layer. The second primer layer 250 can include an oxygen-capturing material that can be sacrificial during the deposition process to prevent degradation or oxidation of the second metallic layer 248 during the sputtering process or subsequent heating processes. The second primer layer 250 can also absorb at least a portion of electromagnetic radiation, such as, visible light, passing through the functional coating 30, 130, 430. Examples of materials useful for the second primer layer 250 include titanium, silicon, silicon dioxide, silicon nitride, silicon oxynitride, nickel, zirconium, aluminum, cobalt, chromium, titanium, aluminum, an alloy thereof, or a mixture thereof. In one non-limiting embodiment, the second primer layer 250 comprises titanium, titanium and aluminum, or zinc and aluminum, which are deposited as a metal and at least a portion of the titanium, or titanium and aluminum, or zinc and aluminum are subsequently oxidized. In another embodiment, the second primer layer 250 comprises a nickel-chromium alloy, such as, Inconel. In another embodiment, the second primer layer 250 comprises a cobalt-chromium alloy, such as, Stellite®.

The second primer layer 250 can have a thickness in the range of from 0.5 nm to 5 nm, such as, from 1 nm to 4 nm, or such as, from 1 nm to 2.5 nm.

A second middle layer 260 is located over at least a portion of the second metallic layer 248 (e.g., over the second primer layer 250). The second middle layer 260 can comprise one or more metal oxide or metal alloy oxide-containing films, such as, those described above with respect to the first middle layer 240. For example, the second middle layer 260 can include a first film 262 comprising a metal oxide, e.g., a zinc oxide or an aluminum zinc oxide, deposited over at least a portion of the second primer layer 250, a second film 264 comprising a metal oxide, e.g., a zinc stannate film over at least a portion of the first film 262, and a third film 266 comprising a metal oxide, e.g., a zinc oxide film or an aluminum zinc oxide film, over at least a portion of the second film 264.

The second middle layer 260 comprises a total thickness (e.g., the combined thicknesses of the layers) in the range of from 20 nm to 100 nm, such as, from 20 nm to 80 nm, such as, from 20 nm to 50 nm, or such as, from 25 nm to 40 nm.

In one example, both of the first and third films 262, 266 are present and each has a thicknesses in the range of from 5 nm to 20 nm, such as, from 5 nm to 20 nm, such as, from 7 nm to 15 nm, such as, from 8 to 15 nm, such as, from 9.5 nm to 10 nm. The second film 264 can have a thickness in the range of from 10 nm to 80 nm, such as, from 20 nm to 70 nm, such as, from 30 nm to 60 nm, such as, from 38 nm to 50 nm, such as, from 38 nm to 45 nm.

A third metallic layer 268 can be formed over a least a portion of the second middle layer 260. The third metallic layer 268 can include a reflective metal, such as, but not limited to, metallic gold, copper, palladium, aluminum, silver, or mixtures, alloys, or combinations thereof. In one embodiment, the third metallic layer 268 comprises a metallic silver layer.

In one embodiment, the third metallic layer 268 is a continuous layer formed over at least a portion of the second middle layer. The third metallic layer 268 is a continuous layer having a total thickness of such as, from 2.5 nm to 30 nm, such as, from 5 nm to 30 nm, such as, from 5 nm to 20 nm, such as, from 7 nm to 20 nm, such as, from, such as, from 12 nm to 18 nm, or such as, from 15 nm to 18 nm.

In another embodiment, the third metallic layer 268 is a discontinuous layer, having a subcritical thickness, formed over at least a portion of the second middle layer. The metallic material, such as, but not limited to, metallic gold, copper, palladium, aluminum, silver, or mixtures, alloys, or combinations thereof, is applied at a subcritical thickness such that isolated regions or islands of the material are formed rather than a continuous layer of the material. For silver, it has been determined that the critical thickness is less than 5 nm, such as, less than 4 nm, such as, less than 3 nm, such as, less than 2.5 nm. For silver, the transition between a continuous layer and a subcritical layer occurs in the range of 2.5 nm to 5 nm. For copper, it has been determined that the effective thickness is at most 9 nm; e.g., 5 nm; 4 nm; e.g., 3.6 nm, e.g., 2.6 nm; e.g., 2 nm; e.g., 1.7 nm; and at least 0.1 nm; e.g., 0.2 nm; e.g. 0.3 nm; e.g. 0.4 nm; e.g. 0.5 nm; e.g. 0.6 nm; e.g. 0.7 nm. It is estimated that copper, gold, and palladium would exhibit similar subcritical behavior in this range. In one non-limiting embodiment, the third metallic layer 268 comprises islanded silver with the islands having an effective thickness of at most 7 nm, e.g., at most 4 nm, e.g., at most 3.5 nm, e.g., at most 3 nm, e.g., at most 2.5 nm, e.g., at most 2 nm; e.g., at most 1.7 nm; and at least 0.1 nm; e.g., at least 0.2 nm; e.g., at least 0.4 nm; e.g., at least 0.5 nm; e.g., at least 0.7 nm; e.g., at least 1 nm. In another embodiment, the third metallic layer 268 comprises copper with the islands having an effective thickness is at most 9 nm; e.g., 5 nm; 40 nm; e.g., 3.6 nm, e.g., 2.6 nm; e.g., 2 nm; e.g., 1.7 nm; and at least 0.1 nm; e.g., 0.2 nm; e.g., 0.3 nm; e.g. 0.4 nm; e.g., 0.5 nm; e.g., 0.6 nm; e.g., 0.7 nm; and, optionally, silver with islands having an effective thickness of at most 7 nm, e.g., at most 4 nm, e.g., at most 3.5 nm, e.g., at most 3 nm, e.g., at most 2.5 nm, e.g., at most 2 nm; e.g., at most 1.7 nm; and at least 0.1 nm; e.g., at least 0.2 nm; e.g., at least 0.4 nm; e.g., at least 0.5 nm; e.g., at least 0.7 nm; e.g., at least 1 nm. The third metallic layer 268 absorbs electromagnetic radiation according to the Plasmon Resonance Theory. This absorption depends at least partly on the boundary conditions at the interface of the metallic islands. The third metallic layer 268 is not an infrared reflecting layer, like the metallic layer 228. It is estimated that for silver and copper, the metallic islands or balls of silver metal and copper metal deposited below the subcritical thickness can have a height of about 2 nm to 7 nm, such as, 5 nm to 7 nm. It is estimated that if the subcritical metal layer could be spread out uniformly, it would have a thickness of about 1.1 nm. It is estimated that optically, the discontinuous metal layer behaves as an effective layer thickness of 2.6 nm.

A third primer layer 270 is located over the third metallic layer 268. The third primer layer 270 can be a single film or a multiple film layer. The third primer layer 270 can include an oxygen-capturing material that can be sacrificial during the deposition process to prevent degradation or oxidation of the third metallic layer 268 during the sputtering process or subsequent heating processes. The third primer layer 270 can also absorb at least a portion of electromagnetic radiation, such as, visible light, passing through the functional coating 30, 130, 430. Examples of materials useful for the third primer layer 270 include titanium, silicon, silicon dioxide, silicon nitride, silicon oxynitride, nickel, zirconium, aluminum, cobalt, chromium, titanium, aluminum, an alloy thereof, or a mixture thereof. In one non-limiting embodiment, the third primer layer 270 comprises titanium, titanium and aluminum, or zinc and aluminum, which are deposited as a metal and at least a portion of the titanium, or titanium and aluminum, or zinc and aluminum are subsequently oxidized. In another embodiment, the third primer layer 270 comprises a nickel-chromium alloy, such as, Inconel. In another embodiment, the third primer layer 270 comprises a cobalt-chromium alloy, such as, Stellite®.

The third primer layer 270 can have a thickness in the range of from 0.5 nm to 5 nm, such as, from 1 nm to 4 nm, or such as, from 1 nm to 2.5 nm.

A third middle layer 280 is located over at least a portion of the third metallic layer 268 (e.g., over the third primer layer). The third middle layer 280 can comprise one or more metal oxide or metal alloy oxide-containing films, such as, those described above with respect to the first middle layer 240. For example, the third middle layer can include a first film 282 comprising a metal oxide, e.g., a zinc oxide or an aluminum zinc oxide, deposited over at least a portion of the third primer layer 270, a second film 284 comprising a metal oxide, e.g., a zinc stannate film over at least a portion of the first film 282, and a third film 286 comprising a metal oxide, e.g., a zinc oxide film or an aluminum zinc oxide film, over at least a portion of the second film 284.

The third middle layer 280 comprises a total thickness (e.g., the combined thicknesses of the layers) in the range of from 20 nm to 100 nm, such as, from 40 nm to 90 nm, such as, from 50 nm to 90 nm, such as, from 65 nm to 80 nm, such as, from 30 nm to 40 nm.

In one example, both of the first and third films 282, 286 are present and each has a thicknesses in the range of from 5 nm to 20 nm, such as, from 7.5 nm to 15 nm, such as, from 8 nm to 15 nm, or such as, from 9.5 to 10 nm. The second film 284 can have a thickness in the range of from 10 nm to 80 nm, such as, from 20 nm to 70 nm, such as, from 30 nm to 60 nm, such as, from 38 nm to 50 nm, such as, from 38 nm to 45 nm.

A fourth metallic layer 288 formed over a least a portion of the third middle layer 280. The fourth metallic layer 288 can include a reflective metal, such as, but not limited to, metallic gold, copper, palladium, aluminum, silver, or mixtures, alloys, or combinations thereof. The fourth metallic layer 288 is a continuous layer. In some embodiments, the fourth metallic layer 288 comprises a metallic silver layer.

The fourth metallic layer 288 is a continuous layer having a total thickness of from 5 nm to 30 nm, such as, from 6 nm to 15 nm, such as, from 6 nm to 10 nm, such as, from 10 nm to 25 nm, such as, from 15 nm to 25 nm, such as, from 20 nm to 25 nm, such as, from 21 nm to 23 nm.

A fourth primer layer 290 is located over the fourth metallic layer 288. The third primer layer 290 can be a single film or a multiple film layer. The fourth primer layer 290 can include an oxygen-capturing material that can be sacrificial during the deposition process to prevent degradation or oxidation of the fourth metallic layer 288 during the sputtering process or subsequent heating processes. The fourth primer layer 290 can also absorb at least a portion of electromagnetic radiation, such as, visible light, passing through the functional coating 30, 130, 430. Examples of materials useful for the fourth primer layer 290 include titanium, silicon, silicon dioxide, silicon nitride, silicon oxynitride, nickel, zirconium, aluminum, cobalt, chromium, titanium, aluminum, an alloy thereof, or a mixture thereof. In one non-limiting embodiment, the fourth primer layer 290 comprises titanium, titanium and aluminum, or zinc and aluminum, which are deposited as a metal and at least a portion of the titanium, or titanium and aluminum, or zinc and aluminum are subsequently oxidized. In another embodiment, the fourth primer layer 290 comprises a nickel-chromium alloy, such as, Inconel. In another embodiment, the fourth primer layer 290 comprises a cobalt-chromium alloy, such as, Stellite®.

The fourth primer layer 290 can have a thickness in the range of from 0.5 nm to 5 nm, such as, from 1 nm to 4 nm, or such as, from 1 nm to 2.5 nm.

A top layer 300 is located over the uppermost metallic layer (e.g., over the uppermost primer layer). In a single metallic layer functional coating 31, 131, the top layer 300 is formed over at least a portion of the metallic layer 228 (e.g., over the first primer layer 230). In a double metallic layer functional coating 32, 132, the top layer 300 is formed over at least a portion of the second metallic layer 248 (e.g., over the second primer layer 250). In a triple metallic layer functional coating 33, 133, the top layer 300 is formed over at least a portion of the third metallic layer 268 (e.g., over the third primer layer 270). In a quadruple metallic layer functional coating 34, 134 the top layer 300 is formed over at least a portion of the fourth metallic layer 288 (e.g., over at least a portion of the fourth primer layer 290).

The top layer 300 can comprise one or more metal oxide or metal alloy oxide-containing films, such as, those described above with respect to the first middle layer 220. For example, the top layer 300 can include a first metal oxide film 302, e.g., a zinc oxide film, deposited over the uppermost metallic layer (e.g., uppermost primer layer) and a second metal alloy film 304, e.g., a zinc stannate film, deposited over at least a portion of the first metal oxide film 302 (FIGS. 4B, 5B, 6B, and 7B). For example, the top layer 300 can include a first metal alloy film 302, e.g., a zinc stannate film, deposited over the uppermost metallic layer (e.g., uppermost primer layer) and a metal oxynitride film 304, e.g., a silicon aluminum oxynitride film, deposited over at least a portion of the first metal alloy film 302. In another embodiment, the top layer 300 can include a first metal oxide film 302, e.g., a zinc oxide film or an aluminum zinc oxide film, deposited over the uppermost metallic layer (e.g., uppermost primer layer), a second metal alloy film 304, e.g., a zinc stannate film, deposited over at least a portion of the first film 302, and a third metal alloy oxynitride film 306, e.g., a silicon aluminum oxynitride film, deposited over the second zinc stannate film 304 (FIGS. 4C, 5C, 6C, and 7C).

The top layer 300 can have a total thickness (e.g., the combined thicknesses of the layers) in the range of from 5 nm to 100 nm, such as, from 20 to 90 nm, such as, from 5 nm to 75 nm, such as, from 25 nm to 60 nm, such as, from 30 nm to 55 nm, such as, from 30 nm to 40 nm, such as, from 10 nm to 80 nm.

An optional outermost protective coating 320 can be formed over at least a portion of the top layer 300 and can be the uppermost layer of the coated article. The outermost protective coating 320 can help protect the underlying functional coating layers, from mechanical and/or chemical attack. The outermost protective coating 320 can be an oxygen barrier coating layer to prevent or reduce the passage of ambient oxygen into the underlying layers of the coating, such as, during heating or bending. The outermost protective coating 320 can be of any desired material or mixture of materials and can be comprised of one or more protective films. The outermost protective coating 320 comprises a protective layer, wherein the protective layer comprises at least one of $Si_3N_4$, SiAlN, SiAlON, SiAlO, TiAlO, titania, alumina, silica, zirconia, or combinations thereof.

In one embodiment, the outermost protective layer may be comprised of a first protective film 322 and second protective film 324 over at least a portion of the first protective film 322. In one embodiment, the first protective film 322 comprises a metal nitride film, e.g., a silicon aluminum nitride, disposed over and in contact with metal oxynitride film (e.g., silicon aluminum oxynitride) of the top layer 300 and the second protective film 324 comprises a metal alloy oxide, such as titanium aluminum oxide, disposed over and in contact with the first protective film 322.

In one embodiment, the metal oxynitride film of the top layer 300 is a metal oxynitride of the same metal as in the first protective metal nitride film 322 that contacts the metal oxynitride film of the top layer 300. In another embodiment, the metal oxynitride film of the top layer 300 is a gradient layer wherein the portion of the metal oxynitride film that is closest to the uppermost metal alloy film of the top layer 300 comprises a greater amount of oxygen, and the opposite portion of the metal oxynitride film, e.g., that is closest to the first protective metal nitride film 322, comprises a greater amount of nitrogen, for example, in atomic ratios described above. In one embodiment, the metal oxynitride film of the top layer 300 and the first protective metal nitride film 322 form a continuous, single gradient layer. In another embodiment, the metal oxynitride film of the top layer 300 is applied over a metal alloy oxide film and/or in between a metal alloy oxide film and the first protective metal nitride film 322. In another embodiment, the first protective metal nitride film 322 is not present, and the metal oxynitride film of the top layer 300 is a gradient layer, wherein amount of oxygen in the metal oxynitride film of the top layer 300 decreases with increased distance from the metal alloy oxide film of top layer 300. For example, the portion of the metal oxynitride film of the top layer 300 that is closest to the uppermost metal alloy oxide film of the top layer 300 comprises a greater amount of oxygen, and the opposite portion of the oxynitride film of the top layer 300, comprises a greater amount of nitrogen, where the atomic ratio of oxygen and nitrogen in metal oxynitrides is an approximation based on the flow rate of nitrogen ($N_2$) and the flow rate of 02. The oxynitride film of the top layer 300 comprises 0 wt. % oxygen, and not more than 50 wt. % oxygen; not more than 40 wt. % oxygen; not more than 30 wt. % oxygen; not more than 20 wt. % oxygen; not more than 10 wt. % oxygen; not more than 5 wt. % oxygen. Non-limiting examples of useful atomic ratios of oxygen and nitrogen in the oxynitride film of the top layer 300 include, for example, and without limitation, from 5% to 45% O with from 95% to 55% N; from 10 to 50% O with from 90% to 50% N; from 15% to 40% O to 85% to 60% N; from 20% to 50% O to 80% to 50% N; from 25% to 45% O to 75% to 55% N; from 30% to 50% O to 70% to 50% N; from 40% to 50% O to 60% to 50% N; or 50% O with 50% N.

The metal oxynitride film of the top layer 300 can have a thickness in the range of from >0 nm to 40 nm, such as, from 7 nm to 40 nm, from 10 nm to 40 nm, from 28 nm to 33 nm, or from 12 nm to 22 nm. In embodiments where the metal oxynitride film of the top layer 300 is a gradient layer, or where there is no metal nitride film in the outermost protective coating, it may have a thickness of from 20 nm to 40 nm, such as, from 22.5 nm to 39 nm, such as, from 25 nm to 38 nm, such as, from 28 nm to 37.5 nm.

The first protective metal nitride film 322 can have a thickness in the range of from >0 nm to 40 nm, such as, from 7 nm to 40 nm, such as, from 10 nm to 40 nm, such as, from 25 nm to 40 nm, such as, from 28 nm to 33 nm, such as, from 20 nm to 25 nm, such as, from 20 nm to 40 nm, such as, from 10 nm to 16 nm. In embodiments where there is no metal oxynitride film of the top layer 300 and/or no second protective film, the first protective metal nitride film 322 can have a thickness in the range of 10 nm to 40 nm, preferably, 25 nm to 40 nm, most preferably, 28 nm to 33 nm. In embodiments where the top layer 300 has a metal oxynitride film and the outermost protective coating 320 has a second protective film 324, the first protective metal nitride film 322 can have a thickness of 10 nm to 40 nm, such as, from 10 nm to 33 nm, such as, from 10.5 nm to 30 nm, such as, from 11.5 nm to 25 nm. In embodiments where the protective coating 320 has both a first protective metal nitride 322 film and a second protective film 324, the metal oxynitride film of the top layer 300 can have a thickness of from 5 nm to 28 nm, such as, from 7.5 nm to 26 nm, such as, from 10 nm to 24 nm, such as, from 12 nm to 22 nm.

In certain embodiments, the invention has a combined thickness of the metal oxynitride film of the top layer 300 (if present) and/or the first protective metal nitride film 322 (if present) of between 20 nm and 80 nm, for example, 32 nm to 80 nm, 32 nm to 38 nm, or 28 nm to 37 nm.

In certain embodiments, the protective coating 320 can comprise a second protective film 324 comprising TiAlO. Non-limiting examples of the second protective film 324 may have a thickness range of such as, from 10 nm to 40 nm, such as, from 20 nm to 37 nm, such as, from 24.5 nm to 30 nm, such as, from 28.5 nm to 30 nm. It is to be understood that the second protective film 324 may be applied, e.g., as the top-most layer, to any other configuration of the top layer, metal nitride films, and metal oxynitride films consistent with the present disclosure. Alternatively, additional functional layers or protective layers may be applied over the second protective film 324 (not shown). This additional protective film can be any of the materials used to form the protective coating 320, or the second protective film 324, or any material that may be used as a topcoat. Similarly, it is to be understood that a coated article need not include a second protective film 324.

The outermost protective coating 320 has a total thickness (i.e., the sum of all of the thickness of the layers or films within the protective coating 320) in the range of from 20 nm to 80 nm, such as, from 30 nm to 70 nm, such as, from 35 nm to 60 nm, such as, from 40 nm to 55 nm.

The outermost protective coating 320 can also comprise a single titania film. The single titania film can have a thickness of from 1 nm to 10 nm, such as, from 2 nm to 8 nm, or such as, from 2 nm to 3 nm.

In the practice of the invention, by selecting a particular metal for the metallic layers, selecting a primer material and thickness, and selecting dielectric material(s) and thickness, the absorbed color (e.g., tint) of the coating can be varied. The coated articles of the present invention may be non-temperable. The coated articles of the present invention may be temperable. In the practice of the invention, it is desired to maintain the color of the coated article before and after tempering.

The coated articles of the present invention having a single metal coating may have a sheet resistance of from 5 Ohms per square ($\Omega/\square$) to 10.00$\Omega/\square$, such as from 6.00$\Omega/\square$ to 9.00$\Omega/\square$, or such as from 6.50$\Omega/\square$ to 8.50$\Omega/\square$. The coated articles of the present invention having a single metal coating may have a sheet resistance of from 6.00$\Omega/\square$ to 11.00$\Omega/\square$, such as from 6.75$\Omega/\square$ to 10.50$\Omega/\square$, or such as from 7.75$\Omega/\square$ to 9.50$\Omega/\square$ after annealing.

The coated articles of the present invention having a double metal coating may have a sheet resistance of from 1.50$\Omega/\square$ to 2.50$\Omega/\square$, such as from 1.60$\Omega/\square$ to 2.10$\Omega/\square$, or such as from 1.75$\Omega/\square$ to 1.95$\Omega/\square$. The coated articles of the present invention having a double metal coating may have a sheet resistance of from 1.50$\Omega/\square$ to 3.50$\Omega/\square$, such as from 2.00$\Omega/\square$ to 3.00$\Omega/\square$, or such as from 2.25$\Omega/\square$ to 2.80$\Omega/\square$ after annealing.

The coated articles of the present invention having a triple metal coating may have a sheet resistance of from 0.50$\Omega/\square$ to 1.25$\Omega/\square$, such as from 0.60$\Omega/\square$ to 1.00$\Omega/\square$, or such as from 0.75$\Omega/\square$ to 0.90$\Omega/\square$. The coated articles of the present invention having a triple metal coating may have a sheet resistance of from 0.60$\Omega/\square$ to 2.00$\Omega/\square$, such as from 0.75$\Omega/\square$ to 1.50$\Omega/\square$, or such as from 1.00$\Omega/\square$ to 1.30$\Omega/\square$ after annealing.

The coated articles of the present invention having a quadruple metal coating may have a sheet resistance of from 0.60$\Omega/\square$ to 1.00$\Omega/\square$, such as from 0.70$\Omega/\square$ to 0.90$\Omega/\square$, or such as from 0.72Ω/☐ to 0.85Ω/☐. The coated articles of the present invention having a quadruple metal coating may have a sheet resistance of from 0.80Ω/☐ to 2.00Ω/☐, such as from 0.90Ω/☐ to 1.70Ω/☐, or such as from 1.00Ω/☐ to 1.50Ω/☐ after annealing. A coated article includes a base layer 220 deposited over at least a portion of a major surface of a substrate 210. The base layer 220 can reduce microscopic scattering center formation in the metallic layer and reduce red haze in the coated article after tempering.

One non-limiting embodiment is a method of reducing microscopic scattering center formation in a metallic layer.

By "scattering center" is meant a branching, tree-like, or dendritic feature in or on the metallic layer or circular agglomerate features at the top of the coating or within any one of the layers of the functional coating. For example, the scattering center can be a crystal or a crystal mass. The scattering can be a void that develops after the metallic layer is heated. These scattering centers are typically formed in or on the metallic layer during the tempering process.

Scattering centers may form in a coated article when the coated article is heated to a temperature that is greater than or equal to 1,185 degrees Fahrenheit (° F., 641 degrees Celsius (° C.)), such as, greater than or equal to 1,200° F. (649° C.), such as, greater than or equal to 1,260° F. (682° C.). Scattering centers that do form when the coated article is heated to a temperature of greater than or equal to 1,185° F. may increase in size when the coated article is then heated to a temperature that is greater than or equal to 1,200° F. As used herein, this temperature refers to the temperature of the surface of the substrate comprising the coating.

Coated articles not having the base layer of the present invention may form scattering centers when the coated articles are heated to a temperature that is greater than or equal to 1,185° F., such as, greater than or equal to 1,200° F.

To reduce the formation of scattering centers in the metallic layer, a substrate is provided. The substrate can be any of the substrates as described herein. The substrate has a first surface and a second surface opposite the first surface. A base layer is formed over at least a portion of the first surface of the second surface. The base layer includes a first film over at least a portion of the substrate comprising tin oxide and second film over the entire portion of the first film. The second film can be any of the materials as described herein. The metallic layer can be any metallic layer as described herein. A top layer is formed over at least a portion of the metallic layer. The top layer can be any top layer as described herein. The forming of the base layer, metallic layer and top layer creates a coated article. The coated article may further comprise additional layers, as described herein. The coated article is heated to a temperature of greater than or equal to 1,185° F., such as, greater than or equal to 1,200° F., wherein the scattering center formation in the metallic layer is reduced in comparison to a coated article without the base layer of the present invention or a coated article having a base layer that is different than the base layer of the present invention.

Another non-limiting embodiment is a method of reducing red haze in a coated article. Scattering centers that form within the metallic layer, as described herein above, can be light scattering features, where light scattering features increase the haze (i.e., light scattering) of the coated article. Scattering centers within the metallic layer cause the light waves of electromagnetic energy to travel more randomly and disrupt the waveguide effect, which increases the amount of electromagnetic energy that passes through the metallic layer, into the substrate, and then exits the bottom surface of the substrate. "Red haze" as described herein relates to a light scattering effect which is visible if a coated article is illuminated by a bright light in front of a dark background. The red haze is formed as a result of voids (depletions or vacancies) that form in the metallic layer during the tempering or heat strengthening process. Alkali metal ion, such as sodium ions, mobility in the glass and the coating stack during heating leads to nucleation and growth that results in the scattering center formation, which leads to a coated article having red haze. The red haze is reduced by forming a base layer over a substrate. The base layer includes a first film over at least a portion of the substrate comprising tin oxide and second film over the entire portion of the first film. The second film can be any of the materials as described herein. A metallic layer is formed over at least a portion of the base layer. The metallic layer can be any metallic layer described herein. A top layer is formed over at least a portion of the metallic layer. The top layer can be any top layer described herein. The forming of the base layer, metallic layer, and top layer creates a coated article. The coated article may comprise additional layers as described herein. The coated article is heated to a temperature that is greater than or equal to 1,185° F., such as, greater than or equal to 1,200° F., wherein the red haze in the coated article is less than the red haze in a coated article without the base layer of the present invention or a coated article having a base layer that is different than the base layer of the present invention.

The migration of metal ions within a coated article can be reduced by forming a base layer over the first surface of the glass substrate. A base layer is formed over at least a portion of the first surface or the second surface. The base layer includes a first film over at least a portion of the substrate comprising tin oxide and second film over the entire portion of the first film, and an optional third film. The second film can be any of the materials as described herein. The metallic layer can be any metallic layer as described herein. A top layer is formed over at least a portion of the metallic layer. The top layer can be any top layer as described herein. The forming of the base layer, metallic layer and top layer creates a coated article. The coated article may further comprise additional layers, as described herein. The coated article is heated to a temperature of greater than or equal to 1,185° F., such as, greater than or equal to 1,200° F., wherein the metal ion migration is reduced in comparison to a coated article without the base layer of the present invention or a coated article having a base layer that is different than the base layer of the present invention. The metal ions may be alkali metal ions, such as sodium ions, or transition metal ions, such as zinc ions.

The following numbered clauses are illustrative of various aspects of the invention:

Clause 1: A coated article comprising a substrate comprising a first surface and second surface opposite the first surface; and a functional coating applied over at least a portion of the first surface, the functional coating comprising a base layer over at least a portion of the substrate; a metallic layer over at least a portion of the base layer; and a top layer over at least a portion of the metallic layer, wherein the base layer comprises a first film comprising tin oxide in direct contact with the portion of the first surface and a second film covering the entire portion of the first film.

Clause 2: The coated article of clause 1, wherein the coated article is temperable.

Clause 3: The coated article of clause 1 or 2, wherein the second film comprises zinc oxide covering the entire portion of the first film.

Clause 4: The coated article of any of clauses 1 to 3, wherein the metallic layer comprises silver, gold, palladium, copper, alloys thereof, mixtures thereof, or combinations thereof.

Clause 5: The coated article of clause 5, wherein the metallic layer comprises silver.

Clause 6: The coated article of any of clauses 1 to 5, wherein the metallic layer is a continuous metallic layer.

Clause 7: The coated article of any of clauses 1 to 6, wherein the top layer comprises a first film and a second film.

Clause 8: The coated article of clause 7, wherein the first film of the top layer comprises zinc oxide over at least a portion of the metallic layer and the second film comprises zinc stannate over at least a portion of the first film.

Clause 9: The coated article of any of clauses 1 to 8, further comprising a first primer layer formed over the metallic layer.

Clause 10: The coated article of clause 9, wherein the primer layer is selected from a group consisting of titanium, silicon, silicon dioxide, silicon nitride, silicon oxynitride, nickel, zirconium, zinc, aluminum, cobalt, chromium, aluminum, an alloy thereof or a mixture thereof.

Clause 11: The coated article of any of clauses 1 to 10, further comprising an outermost protective coating comprising a protective layer, wherein the protective layer comprises at least one of $Si_3N_4$, SiAlN, SiAlON, SiAlO, TiAlO, titania, alumina, silica, zirconia, or combinations thereof.

Clause 12: The coated article of clause 11, wherein the protective layer comprises titania.

Clause 13: The coated article of clause 11, wherein the protective layer comprises a first protective film and a second protective film, wherein the second protective film is positioned over at least a portion of the first protective film.

Clause 14: The coated article of clause 13, wherein the first protective film comprises SiAlO.

Clause 15: The coated article of clause 13, wherein the second protective film comprises TiAlO.

Clause 16: The coated article of any of clauses 1 to 15, wherein the functional coating applied over at least a portion of the first surface further comprises a first middle layer over at least a portion of the metallic layer; and a second metallic layer over at least a portion of the middle layer, wherein the top layer is over at least a portion of the second metallic layer.

Clause 17: The coated article of clause 16, wherein the first middle layer comprises a first film, a second film, and a third film.

Clause 18: The coated article of clause 17, wherein the first film of the first middle layer comprises zinc oxide over at least a portion of the metallic layer, the second film comprises zinc stannate over at least a portion of the first film, and the third film comprises zinc oxide over at least a portion of the second film.

Clause 19: The coated article of any of clauses 16 to 18, wherein the second metallic layer is a continuous layer.

Clause 20: The coated article of any of clauses 16 to 18, wherein the second metallic layer is a discontinuous layer.

Clause 21: The coated article of any of clauses 16 to 20, further comprising a second primer layer formed over the second metallic layer.

Clause 22: The coated article of any of clauses 1 to 15, wherein the functional coating applied over at least a portion of the first surface further comprises: a first middle layer over at least a portion of the metallic layer; a second metallic layer over at least a portion of the first middle layer; a second middle layer over at least a portion of the second metallic layer; and a third metallic layer over at least a portion of the second middle layer, wherein the top layer is over at least a portion of the third metallic layer.

Clause 23: The coated article of clause 22, wherein the second middle layer comprises a first film, a second film, and a third film.

Clause 24: The coated article of clause 23, wherein the first film of the second middle layer comprises zinc oxide over at least a portion of the second metallic layer, the second film comprises zinc stannate over at least a portion of the first film, and the third film comprises zinc oxide over at least a portion of the second film.

Clause 25: The coated article of any of clauses 22 to 24, wherein the third metallic layer is a continuous layer.

Clause 26: The coated article of any of clauses 22 to 24, wherein the third metallic layer is a discontinuous layer.

Clause 27: The coated article of any of clauses 22 to 26, further comprising a third primer layer formed over the third metallic layer.

Clause 28: The coated article of any of clauses 1 to 15, wherein the coating applied over at least a portion of the first surface further comprises a first middle layer over at least a portion of the metallic layer; a second metallic layer over at least a portion of the first middle layer; a second middle layer over at least a portion of the second metallic layer; a third metallic layer over at least a portion of the second middle layer; a third middle layer over at least a portion of the third metallic layer; and a fourth metallic layer over at least a portion of the third middle layer, wherein the top layer is over at least a portion of the fourth metallic layer.

Clause 29: The coated article of clause 28, wherein the third middle layer comprises a first film, a second film, and a third film.

Clause 30: The coated article of clause 29, wherein the first film of the third middle layer comprises zinc oxide over at least a portion of the third metallic layer, the second film comprises zinc stannate over at least a portion of the first film, and the third film comprises zinc oxide over at least a portion of the second film.

Clause 31: The coated article of any of clauses 28 to 30, wherein the fourth metallic layer is a continuous layer.

Clause 32: The coated article of any of clauses 28 to 31, further comprising a fourth primer layer formed over the fourth metallic layer.

Clause 33: A method of reducing scattering center formation in a metallic layer of a coated article, the method comprising providing a substrate comprising a first surface and second surface opposite the first surface; forming a base layer over at least a portion of the first surface; forming a metallic layer over at least a portion of the base layer; and forming a top layer over at least a portion of the metallic layer, thereby, forming the coated article, wherein the base layer comprises a first film comprising tin oxide in direct contact with the portion of the first surface and a second film covering the entire portion of the first film, and heating the coated article to a temperature of greater than or equal to 1,185° F., wherein the coated article has reduced scattering center formation in the metallic layer after heating to a temperature of greater than or equal to 1,185° F.

Clause 34: The method of clause 33, wherein the second film comprises zinc oxide covering the entire portion of the first film.

Clause 35: The method of clause 33 or 34, wherein the metallic layer comprises silver, gold, palladium, copper, alloys thereof, mixtures thereof, or combinations thereof.

Clause 36: The method of clause 35, wherein the metallic layer comprises silver.

Clause 37: The method of any of clauses 33 to 36, wherein the metallic layer is a continuous metallic layer.

Clause 38: The method of any of clauses 33 to 37, wherein the top layer comprises a first film and a second film.

Clause 39: The method of clause 38, wherein the first film of the top layer comprises zinc oxide over at least a portion of the metallic layer and the second film comprises zinc stannate over at least a portion of the first film.

Clause 40: The method of any of clauses 33 to 39, further comprising a first primer layer formed over the metallic layer.

Clause 41: The method of clause 40, wherein the primer layer is selected from a group consisting of titanium, silicon, silicon dioxide, silicon nitride, silicon oxynitride, nickel, zirconium, zinc, aluminum, cobalt, chromium, aluminum, an alloy thereof or a mixture thereof.

Clause 42: The method of any of clauses 33 to 41, further comprising an outermost protective coating comprising a protective layer, wherein the protective layer comprises at least one of $Si_3N_4$, SiAlN, SiAlON, SiAlO, TiAlO, titania, alumina, silica, zirconia, or combinations thereof.

Clause 43: The method of clause 42, wherein the protective layer comprises titania.

Clause 44: The method of clause 42, wherein the protective layer comprises a first protective film and a second protective film, wherein the second protective film is positioned over at least a portion of the first protective film.

Clause 45: The method of clause 44, wherein the first protective film comprises SiAlO.

Clause 46: The method of clause 44, wherein the second protective film comprises TiAlO.

Clause 47: The method of any of clauses 33 to 46, wherein the functional coating applied over at least a portion of the first surface further comprises a first middle layer over at least a portion of the metallic layer; and a second metallic layer over at least a portion of the middle layer, wherein the top layer is over at least a portion of the second metallic layer.

Clause 48: The method of any of clauses 33 to 46, wherein the functional coating applied over at least a portion of the first surface further comprises: a first middle layer over at least a portion of the metallic layer; a second metallic layer over at least a portion of the first middle layer; a second middle layer over at least a portion of the second metallic layer; and a third metallic layer over at least a portion of the second middle layer, wherein the top layer is over at least a portion of the third metallic layer.

Clause 49: The method of any of clauses 33 to 46, wherein the coating applied over at least a portion of the first surface further comprises a first middle layer over at least a portion of the metallic layer; a second metallic layer over at least a portion of the first middle layer; a second middle layer over at least a portion of the second metallic layer; a third metallic layer over at least a portion of the second middle layer; a third middle layer over at least a portion of the third metallic layer; and a fourth metallic layer over at least a portion of the third middle layer, wherein the top layer is over at least a portion of the fourth metallic layer.

Clause 50: The method of any of clauses 33 to 49, wherein the coated article is heated to a temperature of greater than or equal to 1,200° F.

Clause 51: The method of any of clauses 33 to 50, wherein the coated article has reduced scattering center formation as compared to a coated article having a different base layer.

Clause 52: A method of reducing red haze of a coated article, the method comprising providing a substrate comprising a first surface and second surface opposite the first surface; forming a base layer over at least a portion of the first surface; forming a metallic layer over at least a portion of the base layer; and forming a top layer over at least a portion of the metallic layer, thereby, forming the coated article, wherein the base layer comprises a first film comprising tin oxide in direct contact with the portion of the first surface and a second film covering the entire portion of the first film, and heating the coated article to a temperature that is greater than or equal to 1,185° F., wherein the coated article has reduced red haze after heating to a temperature of greater than or equal to 1,185° F.

Clause 53: The method of clause 52, wherein the second film comprises zinc oxide covering the entire portion of the first film.

Clause 54: The method of clause 52 or 53, wherein the metallic layer comprises silver, gold, palladium, copper, alloys thereof, mixtures thereof, or combinations thereof.

Clause 55: The method of clause 54, wherein the metallic layer comprises silver.

Clause 56: The method of any of clauses 52 to 55, wherein the metallic layer is a continuous metallic layer.

Clause 57: The method of any of clauses 52 to 56, wherein the top layer comprises a first film and a second film.

Clause 58: The method of clause 57, wherein the first film of the top layer comprises zinc oxide over at least a portion of the metallic layer and the second film comprises zinc stannate over at least a portion of the first film.

Clause 59: The method of any of clauses 52 to 58, further comprising a first primer layer formed over the metallic layer.

Clause 60: The method of clause 59, wherein the primer layer is selected from a group consisting of titanium, silicon, silicon dioxide, silicon nitride, silicon oxynitride, nickel, zirconium, zinc, aluminum, cobalt, chromium, aluminum, an alloy thereof or a mixture thereof.

Clause 61: The method of any of clauses 52 to 60, further comprising an outermost protective coating comprising a protective layer, wherein the protective layer comprises at least one of $Si_3N_4$, SiAlN, SiAlON, SiAlO, TiAlO, titania, alumina, silica, zirconia, or combinations thereof.

Clause 62: The method of clause 61, wherein the protective layer comprises titania.

Clause 63: The method of clause 61, wherein the protective layer comprises a first protective film and a second protective film, wherein the second protective film is positioned over at least a portion of the first protective film.

Clause 64: The method of clause 63, wherein the first protective film comprises SiAlO.

Clause 65: The method of clause 63, wherein the second protective film comprises TiAlO.

Clause 66: The method of any of clauses 52 to 65, wherein the functional coating applied over at least a portion of the first surface further comprises a first middle layer over at least a portion of the metallic layer; and a second metallic layer over at least a portion of the middle layer, wherein the top layer is over at least a portion of the second metallic layer.

Clause 67: The method of any of clauses 52 to 65, wherein the functional coating applied over at least a portion of the first surface further comprises: a first middle layer over at least a portion of the metallic layer; a second metallic layer over at least a portion of the first middle layer; a second middle layer over at least a portion of the second metallic layer; and a third metallic layer over at least a portion of the second middle layer, wherein the top layer is over at least a portion of the third metallic layer.

Clause 68: The method of any of clauses 52 to 65, wherein the coating applied over at least a portion of the first surface further comprises a first middle layer over at least a portion of the metallic layer; a second metallic layer over at least a portion of the first middle layer; a second middle layer over at least a portion of the second metallic layer; a third metallic layer over at least a portion of the second middle layer; a third middle layer over at least a portion of the third metallic layer; and a fourth metallic layer over at least a portion of the third middle layer, wherein the top layer is over at least a portion of the fourth metallic layer.

Clause 69: The method of any of clauses 52 to 68, wherein the coated article is heated to a temperature of greater than or equal to 1,200° F.

Clause 70: The method of any one of clauses 52 to 69, wherein the coated article has reduced scattering center formation as compared to a coated article having a different base layer.

Clause 71: An insulated glass unit comprising a first ply comprising a No. 1 surface and a No. 2 surface opposite the No. 1 surface; a second ply comprising a No. 3 surface and a No. 4 surface, wherein the second ply is spaced from the first ply, and wherein the first ply and second ply are connected together; and a functional coating over at least a portion of the No. 2 surface or the No. 3 surface, the functional coating comprising a base layer over at least a portion of the No. 2 surface or the No. 3 surface; a metallic layer over at least a portion of the base layer; and a top layer over at least a portion of the metallic layer, wherein the base layer comprises a first film comprising tin oxide in direct contact with the portion of the No. 2 surface or the No. 3 surface and a second film covering the entire portion of the first film.

Clause 72: The insulated glass unit of clause 71, wherein the second film comprises zinc oxide covering the entire portion of the first film.

Clause 73: The insulating glass unit of clause 71 or 72, wherein the metallic layer comprises silver, gold, palladium, copper, alloys thereof, mixtures thereof, or combinations thereof.

Clause 74: The insulating glass unit of clause 73, wherein the metallic layer comprises silver.

Clause 75: The insulating glass unit of any of clauses 71 to 74, wherein the metallic layer is a continuous metallic layer.

Clause 76: The insulating glass unit of any of clauses 71 to 75, wherein the top layer comprises a first film and a second film.

Clause 77: The insulating glass unit of clause 76, wherein the first film of the top layer comprises zinc oxide over at least a portion of the metallic layer and the second film comprises zinc stannate over at least a portion of the first film.

Clause 78: The insulating glass unit of any of clauses 71 to 77, further comprising a first primer layer formed over the metallic layer.

Clause 79: The insulating glass unit of clause 78, wherein the primer layer is selected from a group consisting of titanium, silicon, silicon dioxide, silicon nitride, silicon oxynitride, nickel, zirconium, zinc, aluminum, cobalt, chromium, aluminum, an alloy thereof or a mixture thereof.

Clause 80: The insulating glass unit of any of clauses 71 to 79, further comprising an outermost protective coating comprising a protective layer, wherein the protective layer comprises at least one of $Si_3N_4$, SiAlN, SiAlON, SiAlO, TiAlO, titania, alumina, silica, zirconia, or combinations thereof.

Clause 81: The insulating glass unit of clause 80, wherein the protective layer comprises titania.

Clause 82: The insulating glass unit of clause 80, wherein the protective layer comprises a first protective film and a second protective film, wherein the second protective film is positioned over at least a portion of the first protective film.

Clause 83: The insulating glass unit of clause 82, wherein the first protective film comprises SiAlO.

Clause 84: The insulating glass unit of clause 82, wherein the second protective film comprises TiAlO.

Clause 85: The insulating glass unit of any of clauses 71 to 84, wherein the functional coating applied over at least a portion of the No. 2 surface or the No. 3 surface further comprises a first middle layer over at least a portion of the metallic layer; and a second metallic layer over at least a portion of the middle layer, wherein the top layer is over at least a portion of the second metallic layer.

Clause 86: The insulating glass unit of any of clauses 71 to 84, wherein the functional coating applied over at least a portion of the No. 2 surface or the No. 3 surface further comprises: a first middle layer over at least a portion of the metallic layer; a second metallic layer over at least a portion of the first middle layer; a second middle layer over at least a portion of the second metallic layer; and a third metallic layer over at least a portion of the second middle layer, wherein the top layer is over at least a portion of the third metallic layer.

Clause 87: The insulating glass unit of any of clauses 71 to 84, wherein the coating applied over at least a portion of the No. 2 surface or the No. 3 surface further comprises a first middle layer over at least a portion of the metallic layer; a second metallic layer over at least a portion of the first middle layer; a second middle layer over at least a portion of the second metallic layer; a third metallic layer over at least a portion of the second middle layer; a third middle layer over at least a portion of the third metallic layer; and a fourth metallic layer over at least a portion of the third middle layer, wherein the top layer is over at least a portion of the fourth metallic layer.

Clause 88: A method of making a coated article, the method comprising providing a substrate comprising a first surface and a second surface opposite the first surface; forming a base layer over at least a portion of the first surface; forming a metallic layer over at least a portion of the base layer; and forming a top layer over at least a portion of the metallic layer, wherein the base layer comprises a first film comprising tin oxide in direct contact with the portion of the first surface and a second film covering the entire portion of the first film.

Clause 89: The method of clause 88, wherein the second film comprises zinc oxide covering the entire portion of the first film.

Clause 90: The method of clause 88 or 89, wherein the metallic layer comprises silver, gold, palladium, copper, alloys thereof, mixtures thereof, or combinations thereof.

Clause 91: The method of clause 90, wherein the metallic layer comprises silver.

Clause 92: The method of any of clauses 88 to 91, wherein the metallic layer is a continuous metallic layer.

Clause 93: The method of any of clauses 88 to 92, wherein the top layer comprises a first film and a second film.

Clause 94: The method of clause 93, wherein the first film of the top layer comprises zinc oxide over at least a portion of the metallic layer and the second film comprises zinc stannate over at least a portion of the first film.

Clause 95: The method of any of clauses 88 to 94, further comprising a first primer layer formed over the metallic layer.

Clause 96: The method of clause 95, wherein the primer layer is selected from a group consisting of titanium, silicon, silicon dioxide, silicon nitride, silicon oxynitride, nickel, zirconium, zinc, aluminum, cobalt, chromium, aluminum, an alloy thereof or a mixture thereof.

Clause 97: The method of any of clauses 88 to 96, further comprising an outermost protective coating comprising a protective layer, wherein the protective layer comprises at least one of $Si_3N_4$, SiAlN, SiAlON, SiAlO, TiAlO, titania, alumina, silica, zirconia, or combinations thereof.

Clause 98: The method of clause 97, wherein the protective layer comprises titania.

Clause 99: The method of clause 97, wherein the protective layer comprises a first protective film and a second protective film, wherein the second protective film is positioned over at least a portion of the first protective film.

Clause 100: The method of clause 99, wherein the first protective film comprises SiAlO.

Clause 101: The method of clause 99, wherein the second protective film comprises TiAlO.

Clause 102: The method of any of clauses 88 to 101, wherein the functional coating applied over at least a portion of the first surface further comprises a first middle layer over at least a portion of the metallic layer; and a second metallic layer over at least a portion of the first middle layer, wherein the top layer is over at least a portion of the second metallic layer.

Clause 103: The method of any of clauses 88 to 101, wherein the functional coating applied over at least a portion of the first surface further comprises: a first middle layer over at least a portion of the metallic layer; a second metallic layer over at least a portion of the first middle layer; a second middle layer over at least a portion of the second metallic layer; and a third metallic layer over at least a portion of the second middle layer, wherein the top layer is over at least a portion of the third metallic layer.

Clause 104: The method of any of clauses 88 to 101, wherein the coating applied over at least a portion of the first surface further comprises a first middle layer over at least a portion of the metallic layer; a second metallic layer over at least a portion of the first middle layer; a second middle layer over at least a portion of the second metallic layer; a third metallic layer over at least a portion of the second middle layer; a third middle layer over at least a portion of the third metallic layer; and a fourth metallic layer over at least a portion of the third middle layer, wherein the top layer is over at least a portion of the fourth metallic layer.

Clause 105: A windshield comprising a first ply comprising a No. 1 surface and a No. 2 surface opposite the No. 1 surface; a second ply comprising a No. 3 surface and a No. 4 surface, wherein the second ply is spaced from the first ply, and wherein the first ply and second ply are connected together with an interlayer; and a functional coating over at least a portion of the No. 2 surface or the No. 3 surface, the functional coating comprising a base layer over at least a portion of the No. 2 surface or the No. 3 surface; a metallic layer over at least a portion of the base layer; and a top layer over at least a portion of the metallic layer, wherein the base layer comprises a first film comprising tin oxide in direct contact with the portion of the No. 2 surface or the No. 3 surface and a second film covering the entire portion of the first film.

Clause 106: The windshield of clause 105, wherein the second film comprises zinc oxide covering the entire portion of the first film.

Clause 107: The windshield of clause 105 or 106, wherein the metallic layer comprises silver, gold, palladium, copper, alloys thereof, mixtures thereof, or combinations thereof.

Clause 108: The windshield of clause 107, wherein the metallic layer comprises silver.

Clause 109: The windshield of any of clauses 105 to 108, wherein the metallic layer is a continuous metallic layer.

Clause 110: The windshield of any of clauses 105 to 109, wherein the top layer comprises a first film and a second film.

Clause 111: The windshield of clause 110, wherein the first film of the top layer comprises zinc oxide over at least a portion of the metallic layer and the second film comprises zinc stannate over at least a portion of the first film.

Clause 112: The windshield of any of clauses 105 to 111, further comprising a first primer layer formed over the metallic layer.

Clause 113: The windshield of clause 112, wherein the primer layer is selected from a group consisting of titanium, silicon, silicon dioxide, silicon nitride, silicon oxynitride, nickel, zirconium, zinc, aluminum, cobalt, chromium, aluminum, an alloy thereof or a mixture thereof.

Clause 114: The windshield of any of clauses 105 to 113, further comprising an outermost protective coating comprising a protective layer, wherein the protective layer comprises at least one of $Si_3N_4$, SiAlN, SiAlON, SiAlO, TiAlO, titania, alumina, silica, zirconia, or combinations thereof.

Clause 115: The windshield of clause 114, wherein the protective layer comprises titania.

Clause 116: The windshield of clause 114, wherein the protective layer comprises a first protective film and a second protective film, wherein the second protective film is positioned over at least a portion of the first protective film.

Clause 117: The windshield of clause 116, wherein the first protective film comprises SiAlO.

Clause 118: The windshield of clause 116, wherein the second protective film comprises TiAlO.

Clause 119: The windshield of any of clauses 105 to 118, wherein the functional coating applied over at least a portion of the No. 2 surface or the No. 3 surface further comprises a first middle layer over at least a portion of the metallic layer; and a second metallic layer over at least a portion of the middle layer, wherein the top layer is over at least a portion of the second metallic layer.

Clause 120: The windshield of any of clauses 105 to 118, wherein the functional coating applied over at least a portion of the No. 2 surface or the No. 3 surface further comprises: a first middle layer over at least a portion of the metallic layer; a second metallic layer over at least a portion of the first middle layer; a second middle layer over at least a portion of the second metallic layer; and a third metallic layer over at least a portion of the second middle layer, wherein the top layer is over at least a portion of the third metallic layer.

Clause 121: The windshield of any of clauses 105 to 118, wherein the coating applied over at least a portion of the No. 2 surface or the No. 3 surface further comprises a first middle layer over at least a portion of the metallic layer; a second metallic layer over at least a portion of the first middle layer; a second middle layer over at least a portion of the second metallic layer; a third metallic layer over at least a portion of the second middle layer; a third middle layer over at least a portion of the third metallic layer; and a fourth metallic layer over at least a portion of the third middle layer, wherein the top layer is over at least a portion of the fourth metallic layer.

Clause 122: A method of reducing metal ion migration within a coated article, the method comprising: providing a glass substrate comprising a first surface and a second surface opposite the first surface; forming a base layer over at least a portion of the first surface; forming a metallic layer over at least a portion of the base layer; and forming a top layer over at least a portion of the metallic layer, thereby, forming the coated article, wherein the base layer comprises a first film comprising tin oxide in direct contact with the portion of the first surface and a second film covering the entire portion of the first film, and heating the coated article to a temperature of greater than or equal to 1,185° F., wherein the coated article has reduced metal ion migration after heating to a temperature of greater than or equal to 1,185° F.

Clause 123: The method of clause 122, wherein the second film comprises zinc oxide covering the entire portion of the first film.

Clause 124: The method of clause 122 or 123, wherein the metallic layer comprises silver, gold, palladium, copper, alloys thereof, mixtures thereof, or combinations thereof.

Clause 125: The method of clause 124, wherein the metallic layer comprises silver.

Clause 126: The method of any of clauses 122 to 125, wherein the metallic layer is a continuous metallic layer.

Clause 127: The method of any of clauses 122 to 126, wherein the top layer comprises a first film and a second film.

Clause 128: The method of clause 127, wherein the first film of the top layer comprises zinc oxide over at least a portion of the metallic layer and the second film comprises zinc stannate over at least a portion of the first film.

Clause 129: The method of any of clauses 122 to 128, further comprising a first primer layer formed over the metallic layer.

Clause 130: The method of clause 129, wherein the primer layer is selected from a group consisting of titanium, silicon, silicon dioxide, silicon nitride, silicon oxynitride, nickel, zirconium, zinc, aluminum, cobalt, chromium, aluminum, an alloy thereof or a mixture thereof.

Clause 131: The method of any of clauses 122 to 130, further comprising an outermost protective coating comprising a protective layer, wherein the protective layer comprises at least one of $Si_3N_4$, SiAlN, SiAlON, SiAlO, TiAlO, titania, alumina, silica, zirconia, or combinations thereof.

Clause 132: The method of clause 131, wherein the protective layer comprises titania.

Clause 133: The method of clause 131, wherein the protective layer comprises a first protective film and a second protective film, wherein the second protective film is positioned over at least a portion of the first protective film.

Clause 134: The method of clause 133, wherein the first protective film comprises SiAlO.

Clause 135: The method of clause 133, wherein the second protective film comprises TiAlO.

Clause 136: The method of any of clauses 122 to 135, wherein the functional coating applied over at least a portion of the first surface further comprises a first middle layer over at least a portion of the metallic layer; and a second metallic layer over at least a portion of the middle layer, wherein the top layer is over at least a portion of the second metallic layer.

Clause 137: The method of any of clauses 122 to 135, wherein the functional coating applied over at least a portion of the first surface further comprises: a first middle layer over at least a portion of the metallic layer; a second metallic layer over at least a portion of the first middle layer; a second middle layer over at least a portion of the second metallic layer; and a third metallic layer over at least a portion of the second middle layer, wherein the top layer is over at least a portion of the third metallic layer.

Clause 138: The method of any of clauses 122 to 135, wherein the coating applied over at least a portion of the first surface further comprises a first middle layer over at least a portion of the metallic layer; a second metallic layer over at least a portion of the first middle layer; a second middle layer over at least a portion of the second metallic layer; a third metallic layer over at least a portion of the second middle layer; a third middle layer over at least a portion of the third metallic layer; and a fourth metallic layer over at least a portion of the third middle layer, wherein the top layer is over at least a portion of the fourth metallic layer.

Clause 139: The method of any of clauses 122 to 138, wherein the metal ions are sodium ions.

Clause 140: The method of any of clauses 122 to 138, wherein the metal ions are zinc ions.

Clause 141: The method of any of clauses 122 to 140, wherein the coated article is heated to a temperature of greater than or equal to 1,200° F.

Clause 142: The method of any one of clauses 122 to 141, wherein the coated article has reduced metal ion migration as compared to a coated article having a different base layer.

EXAMPLES

A substrate was coated with functional coatings according to Table 1. The substrates were glass. $SnO_x$ is tin oxide that is substantially free of any additional metals. $Sn_{80}Zn_{20}O_x$ and $Sn_{90}Zn_{10}O_x$ are tin oxides that are sputtered with zinc oxide. The coated substrates were then heated to a temperature of 1,260° F.±3-4° F.

TABLE 1

| Sample No. | 1 | 2 | 3 |
|---|---|---|---|
| First Film of Base Layer | $SnO_x$ | $Sn_{80}Zn_{20}O_x$ | $Sn_{90}Zn_{10}O_x$ |
| Second Film of Base Layer | Zinc Oxide | Zinc Oxide | Zinc Oxide |
| Metallic Layer | Silver | Silver | Silver |
| Primer Layer | Titanium | Titanium | Titanium |
| First Film of First Middle Layer | Zinc Oxide | Zinc Oxide | Zinc Oxide |
| Second Film of First Middle Layer | Zinc Stannate | Zinc Stannate | Zinc Stannate |
| Third Film of First Middle Layer | Zinc Oxide | Zinc Oxide | Zinc Oxide |
| Second Metallic Layer | Silver | Silver | Silver |
| Second Primer Layer | Titanium | Titanium | Titanium |

TABLE 1-continued

| Sample No. | 1 | 2 | 3 |
|---|---|---|---|
| First Film of Top Layer | Zinc Oxide | Zinc Oxide | Zinc Oxide |
| Second Film of Top Layer | Zinc Stannate | Zinc Stannate | Zinc Stannate |

A comparative example was prepared by coating a substrate with the coating according to Table 2. The substrate was glass. $SiAlO_x$ is silicon aluminum oxide. The coated substrates were then heated to a temperature of 1,260° F.±3-4° F.

TABLE 2

| Sample No. | CE-1 |
|---|---|
| First Film of First Layer | $SiAlO_x$ |
| Second Film of First Layer | Zinc Oxide |
| Metallic Layer | Silver |
| Primer Layer | Titanium |
| First Film of First Middle Layer | Zinc Oxide |
| Second Film of First Middle Layer | Zinc Stannate |
| Third Film of First Middle Layer | Zinc Oxide |
| Second Metallic Layer | Silver |
| Second Primer Layer | Titanium |
| First Film of Top Layer | Zinc Oxide |
| Second Film of Top Layer | Zinc Stannate |

The coated substrate of Sample No. 1 and Sample No. CE-1 were analyzed using X-Ray Photoelectron Spectroscopy (XPS). The coated substrate of Sample No. 1 had a reduction in sodium atom migration from the glass substrate into the functional coating. The coated substrate of Sample CE-1 had sodium ion migration from the glass substrate into the first film and second film of the first layer and the metallic layer closest to the glass substrate. The coated substrate of Sample CE-1 also had zinc ion migration from the second film of the first layer into the glass substrate.

PROPHETIC EXAMPLES

Substrates may be coated with functional coatings according to Table 3. The substrates may be glass. $SnO_x$ is tin oxide that is substantially free of any additional metals.

TABLE 3

| Sample No. | 4 | 5 | 6 | 7 |
|---|---|---|---|---|
| First Film of Base Layer | $SnO_x$ | $SnO_x$ | $SnO_x$ | $SnO_x$ |
| Second Film of Base Layer | Zinc Oxide | Zinc Oxide | Zinc Stannate | Zinc Stannate |
| Third Film of Base Layer | N/A | N/A | Zinc Oxide | Zinc Oxide |
| Metallic Layer | Silver (Continuous) | Silver (Discontinuous) | Silver (Continuous) | Silver (Discontinuous) |
| Primer Layer | Titanium | Titanium | Titanium | Titanium |
| First film of Top Layer | Zinc Oxide | Zinc Oxide | Zinc Oxide | Zinc Oxide |
| Second Film of Top Layer | Zinc Stannate | Zinc Stannate | Zinc Stannate | Zinc Stannate |

The top layer of Sample Nos. 4-7 may include silicon nitride ($Si_3N_4$), silicon oxynitride (SiON), SiON to $Si_3N_4$, or a gradient layer of SiON. Sample Nos. 4-7 may have an outermost protective coating having a protective layer. The protective layer may include $Si_3N_4$, SiAlN, SiAlON, SiAlO, TiAlO, titania, alumina, silica, zirconia, or combinations thereof.

Substrates may be coated with functional coatings according to Table 4. The substrates may be glass. $SnO_x$ is tin oxide that is substantially free of any additional metals.

TABLE 4

| Sample No. | 8 | 9 | 10 | 11 |
|---|---|---|---|---|
| First Film of Base Layer | $SnO_x$ | $SnO_x$ | $SnO_x$ | $SnO_x$ |
| Second Film of Base Layer | Zinc Oxide | Zinc Oxide | Zinc Oxide | Zinc Oxide |
| Metallic Layer | Silver (Continuous) | Silver (Continuous) | Silver (Discontinuous) | Silver (Discontinuous) |
| Primer Layer | Titanium | Titanium | Titanium | Titanium |
| First Film of First Middle Layer | Zinc Oxide | Zinc Oxide | Zinc Oxide | Zinc Oxide |
| Second Film of First Middle Layer | Zinc Stannate | Zinc Stannate | Zinc Stannate | Zinc Stannate |
| Third Film of First Middle Layer | Zinc Oxide | Zinc Oxide | Zinc Oxide | Zinc Oxide |
| Second Metallic Layer | Silver (Continuous) | Silver (Discontinuous) | Silver (Continuous) | Silver (Discontinuous) |
| Second Primer Layer | Titanium | Titanium | Titanium | Titanium |
| First Film of Top Layer | Zinc Oxide | Zinc Oxide | Zinc Oxide | Zinc Oxide |
| Second Film of Top Layer | Zinc Stannate | Zinc Stannate | Zinc Stannate | Zinc Stannate |

The top layer of Sample Nos. 8-11 may include $Si_3N_4$, SiON, SiON to $Si_3N_4$, or a gradient layer of SiON. Sample Nos. 8-11 may have an outermost protective coating having a protective layer. The protective layer may be $Si_3N_4$, SiAlN, SiAlON, SiAlO, TiAlO, titania, alumina, silica, zirconia, or combinations thereof.

Substrates may be coated with functional coatings according to Table 5. The substrates may be glass. $SnO_x$ is tin oxide that is substantially free of any additional metals.

TABLE 5

| Sample No. | 12 | 13 | 14 | 15 |
|---|---|---|---|---|
| First Film of Base Layer | $SnO_x$ | $SnO_x$ | $SnO_x$ | $SnO_x$ |
| Second Film of Base Layer | Zinc Stannate | Zinc Stannate | Zinc Stannate | Zinc Stannate |
| Third Film of Base Layer | Zinc Oxide | Zinc Oxide | Zinc Oxide | Zinc Oxide |
| Metallic Layer | Silver (Continuous) | Silver (Continuous) | Silver (Discontinuous) | Silver (Discontinuous) |
| Primer Layer | Titanium | Titanium | Titanium | Titanium |
| First Film of First Middle Layer | Zinc Oxide | Zinc Oxide | Zinc Oxide | Zinc Oxide |
| Second Film of First Middle Layer | Zinc Stannate | Zinc Stannate | Zinc Stannate | Zinc Stannate |
| Third Film of First Middle Layer | Zinc Oxide | Zinc Oxide | Zinc Oxide | Zinc Oxide |
| Second Metallic Layer | Silver (Continuous) | Silver (Discontinuous) | Silver (Continuous) | Silver (Discontinuous) |
| Second Primer Layer | Titanium | Titanium | Titanium | Titanium |
| First Film of Top Layer | Zinc Oxide | Zinc Oxide | Zinc Oxide | Zinc Oxide |
| Second Film of Top Layer | Zinc Stannate | Zinc Stannate | Zinc Stannate | Zinc Stannate |

The top layer of Sample Nos. 12-15 may include $Si_3N_4$, SiON, SiON to $Si_3N_4$, or a gradient layer of SiON. Sample Nos. 12-15 may have an outermost protective coating having a protective layer. The protective layer may be $Si_3N_4$, SiAlN, SiAlON, SiAlO, TiAlO, titania, alumina, silica, zirconia, or combinations thereof.

Substrates may be coated with functional coatings according to Table 6. The substrates may be glass. $SnO_x$ is tin oxide that is substantially free of any additional metals.

TABLE 6

| Sample No. | 16 | 17 |
|---|---|---|
| First Film of Base Layer | $SnO_x$ | $SnO_x$ |
| Second Film of Base Layer | Zinc Oxide | Zinc Stannate |
| Third Film of Base Layer | N/A | Zinc |

TABLE 6-continued

| Sample No. | 16 | 17 |
|---|---|---|
| Base Layer | | Oxide |
| Metallic Layer | Silver (Continuous) | Silver (Continuous) |
| Primer Layer | Titanium | Titanium |
| First Film of First Middle Layer | Zinc Oxide | Zinc Oxide |
| Second Film of First Middle Layer | Zinc Stannate | Zinc Stannate |
| Third Film of First Middle Layer | Zinc Oxide | Zinc Oxide |
| Second Metallic Layer | Silver (Discontinuous) | Silver (Discontinuous) |
| Second Primer Layer | Titanium | Titanium |
| First Film of Second Middle Layer | Zinc Oxide | Zinc Oxide |
| Second Film of Second Middle Layer | Zinc Stannate | Zinc Stannate |
| Third Film of Second Middle Layer | Zinc Oxide | Zinc Oxide |
| Third Metallic Layer | Silver (Continuous) | Silver (Continuous) |
| Third Primer Layer | Titanium | Titanium |
| First Film of Top Layer | Zinc Oxide | Zinc Oxide |
| Second Film of Top Layer | Zinc Stannate | Zinc Stannate |

The top layer of Sample Nos. 16 and 17 may include $Si_3N_4$, SiON, SiON to $Si_3N_4$, or a gradient layer of SiON. Sample Nos. 16 and 17 may have an outermost protective coating having a protective layer. The protective layer may be $Si_3N_4$, SiAlN, SiAlON, SiAlO, TiAlO, titania, alumina, silica, zirconia, or combinations thereof.

Substrates may be coated with functional coatings according to Table 7. The substrates may be glass. $SnO_x$ is tin oxide that is substantially free of any additional metals.

TABLE 7

| Sample No. | 18 | 19 | 20 | 21 |
|---|---|---|---|---|
| First Film of Base Layer | $SnO_x$ | $SnO_x$ | $SnO_x$ | $SnO_x$ |
| Second Film of Base Layer | Zinc Oxide | Zinc Oxide | Zinc Stannate | Zinc Stannate |
| Third Film of Base Layer | N/A | N/A | Zinc Oxide | Zinc Oxide |
| Metallic Layer | Silver (Continuous) | Silver (Continuous) | Silver (Continuous) | Silver (Continuous) |
| Primer Layer | Titanium | Titanium | Titanium | Titanium |
| First Film of First Middle Layer | Zinc Oxide | Zinc Oxide | Zinc Oxide | Zinc Oxide |
| Second Film of First Middle Layer | Zinc Stannate | Zinc Stannate | Zinc Stannate | Zinc Stannate |
| Third Film of First Middle Layer | Zinc Oxide | Zinc Oxide | Zinc Oxide | Zinc Oxide |
| Second Metallic Layer | Silver (Continuous) | Silver (Discontinuous) | Silver (Continuous) | Silver (Discontinuous) |
| Second Primer Layer | Titanium | Titanium | Titanium | Titanium |
| First Film of Second Middle Layer | Zinc Oxide | Zinc Oxide | Zinc Oxide | Zinc Oxide |
| Second Film of Second Middle Layer | Zinc Stannate | Zinc Stannate | Zinc Stannate | Zinc Stannate |
| Third Film of Second Middle Layer | Zinc Oxide | Zinc Oxide | Zinc Oxide | Zinc Oxide |
| Third Metallic Layer | Silver (Discontinuous) | Silver (Continuous) | Silver (Discontinuous) | Silver (Continuous) |
| Third Primer Layer | Titanium | Titanium | Titanium | Titanium |
| First Film of Third Middle Layer | Zinc Oxide | Zinc Oxide | Zinc Oxide | Zinc Oxide |
| Second Film of Third Middle Layer | Zinc Stannate | Zinc Stannate | Zinc Stannate | Zinc Stannate |
| Third Film of Third Middle Layer | Zinc Oxide | Zinc Oxide | Zinc Oxide | Zinc Oxide |
| Fourth Metallic Layer | Silver (Continuous) | Silver (Continuous) | Silver (Continuous) | Silver (Continuous) |
| Fourth Primer Layer | Titanium | Titanium | Titanium | Titanium |
| First Film of Top Layer | Zinc Oxide | Zinc Oxide | Zinc Oxide | Zinc Oxide |
| Second Film of Top Layer | Zinc Stannate | Zinc Stannate | Zinc Stannate | Zinc Stannate |

The top layer of Sample Nos. 18-21 may include $Si_3N_4$, SiON, SiON to $Si_3N_4$, or a gradient layer of SiON. Sample Nos. 18-21 may have an outermost protective coating having a protective layer. The protective layer may be $Si_3N_4$, SiAlN, SiAlON, SiAlO, TiAlO, titania, alumina, silica, zirconia, or combinations thereof.

It will be readily appreciated by those skilled in the art that modification may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

The invention claimed is:

1. A heat-treated coated article comprising:
   a substrate comprising a first surface and second surface opposite the first surface; and
   a functional coating applied over at least a portion of the first surface, the functional coating comprising:
      a base layer over at least a portion of the first surface;
      a metallic layer over at least a portion of the base layer; and
      a top layer over at least a portion of the metallic layer,
      wherein the base layer comprises a first film comprising tin oxide in direct contact with the portion of the first surface and a second film comprising zinc covering the entire portion of the first film,
   wherein the heat-treated coated article comprises a red haze that is less than a red haze of a second heat-treated coated article comprising a base layer without a first film comprising tin oxide after heating, and
   wherein the tin oxide of the first film comprises at least 80 weight percent (wt. %) tin and at most 20 wt. % zinc oxide.

2. The coated article of claim 1, wherein the coated article is temperable.

3. The coated article of claim 1, wherein the second film comprises zinc oxide or zinc stannate covering the entire portion of the first film.

4. The coated article of claim 1, wherein the metallic layer comprises silver.

5. The coated article of claim 1, wherein the metallic layer is a continuous metallic layer.

6. The coated article of claim 1, wherein the top layer comprises a first film and a second film.

7. The coated article of claim 6, wherein the first film of the top layer comprises zinc oxide over at least a portion of the metallic layer and the second film comprises zinc stannate over at least a portion of the first film.

8. The coated article of claim 1, further comprising a first primer layer formed over the metallic layer.

9. The coated article of claim 8, wherein the primer layer is selected from a group consisting of titanium, silicon, silicon dioxide, silicon nitride, silicon oxynitride, nickel, zirconium, zinc, aluminum, cobalt, chromium, aluminum, an alloy thereof or a mixture thereof.

10. The coated article of claim 1, further comprising an outermost protective coating comprising a protective layer, wherein the protective layer comprises at least one of $Si_3N_4$, SiAlN, SiAlON, SiAlO, TiAlO, titania, alumina, silica, zirconia, or combinations thereof.

11. The coated article of claim 1, wherein the functional coating applied over at least a portion of the first surface further comprises:
   a first middle layer over at least a portion of the metallic layer; and
   a second metallic layer over at least a portion of the middle layer,
   wherein the top layer is over at least a portion of the second metallic layer.

12. The coated article of claim 11, further comprising a second primer layer formed over the second metallic layer.

13. The coated article of claim 1, wherein the functional coating applied over at least a portion of the first surface further comprises:
   a first middle layer over at least a portion of the metallic layer;
   a second metallic layer over at least a portion of the first middle layer;
   a second middle layer over at least a portion of the second metallic layer; and
   a third metallic layer over at least a portion of the second middle layer,
   wherein the top layer is over at least a portion of the third metallic layer.

14. The coated article of claim 13, further comprising a third primer layer formed over the third metallic layer.

15. The coated article of claim 1, wherein the coating applied over at least a portion of the first surface further comprises:
   a first middle layer over at least a portion of the metallic layer;
   a second metallic layer over at least a portion of the first middle layer;
   a second middle layer over at least a portion of the second metallic layer;
   a third metallic layer over at least a portion of the second middle layer;
   a third middle layer over at least a portion of the third metallic layer; and
   a fourth metallic layer over at least a portion of the third middle layer,
   wherein the top layer is over at least a portion of the fourth metallic layer.

16. The coated article of claim 15, further comprising a fourth primer layer formed over the fourth metallic layer.

17. The coated article of claim 1, wherein the first film has a thickness of 10 nm to 45 nm.

18. The coated article of claim 1, wherein the first film comprises at least 90% tin oxide.

19. An insulated glass unit comprising:
   a first ply comprising a No. 1 surface and a No. 2 surface opposite the No. 1 surface;
   a second ply comprising a No. 3 surface and a No. 4 surface,
      wherein the second ply is spaced from the first ply, and
      wherein the first ply and second ply are connected together; and
   a heat-treated functional coating over at least a portion of the No. 2 surface or the No. 3 surface, the heat-treated functional coating comprising:
   a base layer over at least a portion of the No. 2 surface or the No. 3 surface;
   a metallic layer over at least a portion of the base layer; and
   a top layer over at least a portion of the metallic layer,
   wherein the base layer comprises a first film comprising tin oxide in direct contact with the portion of the No. 2 surface or the No. 3 surface and a second film comprising zinc covering the entire portion of the first film,
   wherein the first ply or the second ply comprising the heat-treated functional coating has a red haze that is less than a red haze of a first ply or second ply comprising a heat-treated functional coating comprising a base layer without a first film comprising tin oxide after heating, and
   wherein the tin oxide of the first film comprises at least 80 wt. % tin and at most 20 wt. % zinc oxide.

20. The coated article of claim 1, wherein the tin oxide is substantially free of additional metals.

21. The insulated glass unit of claim 19, wherein the tin oxide is substantially free of additional metals.

22. The insulated glass unit of claim 19, wherein the first ply or the second ply is tempered.

23. The insulated glass unit of claim 19, wherein the second film comprises zinc oxide or zinc stannate covering the entire portion of the first film.

24. The insulated glass unit of claim 19, wherein the metallic layer comprises silver.

25. The insulated glass unit of claim 19, wherein the metallic layer is a continuous metallic layer.

26. The insulated glass unit of claim 19, wherein the top layer comprises a first film and a second film, and wherein the first film of the top layer comprises zinc oxide over at least a portion of the metallic layer and the second film comprises zinc stannate over at least a portion of the first film.

27. The insulated glass unit of claim 19, further comprising a first primer layer formed over the metallic layer, and wherein the primer layer is selected from a group consisting of titanium, silicon, silicon dioxide, silicon nitride, silicon oxynitride, nickel, zirconium, zinc, aluminum, cobalt, chromium, aluminum, an alloy thereof or a mixture thereof.

28. The insulated glass unit of claim 19, further comprising an outermost protective coating comprising a protective layer, wherein the protective layer comprises at least one of $Si_3N_4$, SiAlN, SiAlON, SiAlO, TiAlO, titania, alumina, silica, zirconia, or combinations thereof.

29. The insulated glass unit of claim 19, wherein the heat-treated functional coating further comprises:
   a first middle layer over at least a portion of the metallic layer; and
   a second metallic layer over at least a portion of the middle layer,
   wherein the top layer is over at least a portion of the second metallic layer.

30. The insulated glass unit of claim 19, wherein the heat-treated functional coating further comprises:
   a first middle layer over at least a portion of the metallic layer;
   a second metallic layer over at least a portion of the first middle layer;
   a second middle layer over at least a portion of the second metallic layer; and
   a third metallic layer over at least a portion of the second middle layer,
   wherein the top layer is over at least a portion of the third metallic layer.

31. The insulated glass unit of claim 19, wherein the heat-treated functional coating further comprises:
   a first middle layer over at least a portion of the metallic layer;
   a second metallic layer over at least a portion of the first middle layer;
   a second middle layer over at least a portion of the second metallic layer;
   a third metallic layer over at least a portion of the second middle layer;
   a third middle layer over at least a portion of the third metallic layer; and
   a fourth metallic layer over at least a portion of the third middle layer,
   wherein the top layer is over at least a portion of the fourth metallic layer.

32. The insulated glass unit of claim 19, wherein the first film has a thickness of 10 nm to 45 nm.

33. The insulated glass unit of claim 19, wherein the first film comprises at least 90% tin oxide.

* * * * *